United States Patent
Kim

(10) Patent No.: US 12,547,640 B2
(45) Date of Patent: Feb. 10, 2026

(54) METHOD FOR ESTABLISHING ESG DATABASE WITH STRUCTURED ESG DATA USING ESG AUXILIARY TOOL AND ESG SERVICE PROVIDING SYSTEM PERFORMING THE SAME

(71) Applicant: I-ESG INC., Seoul (KR)

(72) Inventor: Jong Woong Kim, Seoul (KR)

(73) Assignee: I-ESG INC., Seoul (KR)

(*) Notice: Subject to any disclaimer, the term of this patent is extended or adjusted under 35 U.S.C. 154(b) by 0 days.

(21) Appl. No.: 19/070,877

(22) Filed: Mar. 5, 2025

(65) Prior Publication Data
US 2025/0217381 A1 Jul. 3, 2025

Related U.S. Application Data

(63) Continuation of application No. PCT/KR2023/011363, filed on Aug. 2, 2023.

(30) Foreign Application Priority Data

Aug. 5, 2022 (KR) ................. 10-2022-0097981
Aug. 5, 2022 (KR) ................. 10-2022-0097982

(51) Int. Cl.
G06F 16/25 (2019.01)
(52) U.S. Cl.
CPC ................. G06F 16/258 (2019.01)
(58) Field of Classification Search
CPC ...... G06F 16/258; G06F 16/22; G06F 40/205; G06F 40/274; G06F 40/284; G06N 3/08; G06Q 10/04; G06Q 10/06; G06Q 10/10
See application file for complete search history.

(56) References Cited

U.S. PATENT DOCUMENTS 12,135,751 B1 * 11/2024 Wright ................. G06F 16/951
2014/0006369 A1 * 1/2014 Blanchflower ... G06F 16/90344
707/706

(Continued)

FOREIGN PATENT DOCUMENTS

KR    10-1695277 B1    1/2017
KR    10-1942468 B1    2/2019

(Continued)

OTHER PUBLICATIONS

C. Maree and C. W. Omlin, "Balancing Profit, Risk, and Sustainability for Portfolio Management," 2022 IEEE Symposium on Computational Intelligence for Financial Engineering and Economics (CIFEr), Helsinki, Finland, 2022, pp. 1-8 (Year: 2022) (Year: 2022).*

(Continued)

*Primary Examiner* — Cheyne D Ly
(74) *Attorney, Agent, or Firm* — Sughrue Mion, PLLC

(57) ABSTRACT

The present disclosure relates to a method for establishing an ESG database including: parsing an ESG document subject to structuring; screening whether the parsed ESG document includes items corresponding to at least one of the pre-stored plurality of ESG management items; specifying a selection status for items in the ESG document based on whether an item corresponding to the ESG management item is included in the document; activating or deactivating input fields for final input field values for the pre-stored plurality of ESG management items according to the designation result of the selection status; and generating structured data by obtaining the content of items corresponding to ESG management items determined to be included in the document, and an ESG service providing system performing the same.

7 Claims, 11 Drawing Sheets

(56) References Cited

U.S. PATENT DOCUMENTS

2019/0362427 A1* 11/2019 Chen .................... G06Q 10/067
2022/0050838 A1    2/2022 Piatetsky et al.

FOREIGN PATENT DOCUMENTS

| KR | 10-2019-0059449 A | 5/2019 |
| KR | 10-2026304 B1 | 9/2019 |
| KR | 10-2020-0059730 A | 5/2020 |
| KR | 10-2020-0135607 A | 12/2020 |
| KR | 10-2021-0108293 A | 9/2021 |
| KR | 10-2021-0109914 A | 9/2021 |
| KR | 10-2532216 B1 | 5/2023 |

OTHER PUBLICATIONS

G. Yu, Y. Liu, W. Cheng and C.-T. Lee, "Data Analysis of ESG Stocks in the Chinese Stock Market Based on Machine Learning," 2022 2nd International Conference on Consumer Electronics and Computer Engineering (ICCECE), Guangzhou, China, 2022, pp. 486-493 (Year: 2022) (Year: 2022).*

S. Jain, A. de Buitléir and E. Fallon, "A Review of Unstructured Data Analysis and Parsing Methods, " 2020 International Conference on Emerging Smart Computing and Informatics (ESCI), Pune, India, 2020, pp. 164-169. (Year: 2020).*

Leidner, J.L., Kamkova, D. (2013). Making Structured Data Searchable via Natural Language Generation. In: Larsen, H.L., Martin-Bautista, M.J., Vila, M.A., Andreasen, T., Christiansen, H. (eds) Flexible Query Answering Systems. FQAS 2013. Lecture Notes in Computer Science(), vol. 8132. (Year: 213).*

Sokolov, Alik, et al. "Building machine learning systems for automated ESG scoring." The Journal of Impact and ESG Investing 1.3 (2021): 39-50. (Year: 2021).*

Parra et al. "Exploratory Content Analysis Using Text Data Mining: Corporate Citizenship Reports of Seven US Companies from 2004 to 2012." The Journal of Corporate Citizenship, No. 66, 2017, pp. 106-151. JSTOR, (Year: 2017).*

Y. Zheng, H. Zhou, Z. Chen and N. N. Ekedebe, "Automated analysis and evaluation of SEC documents," 2014 IEEE/ACIS 13th International Conference on Computer and Information Science (ICIS), Taiyuan, China, 2014, pp. 119-124 (Year: 2014).*

International Search Report issued Nov. 2, 2023 in International Application No. PCT/KR2023/011363.

Written Opinion of the International Searching Authority issued Nov. 2, 2023 in International Application No. PCT/KR2023/011363.

Office Action issued Jan. 30, 2023 in Korean Application No. 10-2022-0097981.

Office Action issued Jun. 13, 2023 in Korean Application No. 10-2022-0097981.

Office Action issued Mar. 7, 2023 in Korean Application No. 10-2022-0097981.

Notice of Allowance issued Jun. 29, 2023 in Korean Application No. 10-2022-0097981.

Office Action issued Jan. 30, 2023 in Korean Application No. 10-2022-0097982.

Notice of Allowance issued Mar. 7, 2023 in Korean Application No. 10-2022-0097982.

* cited by examiner

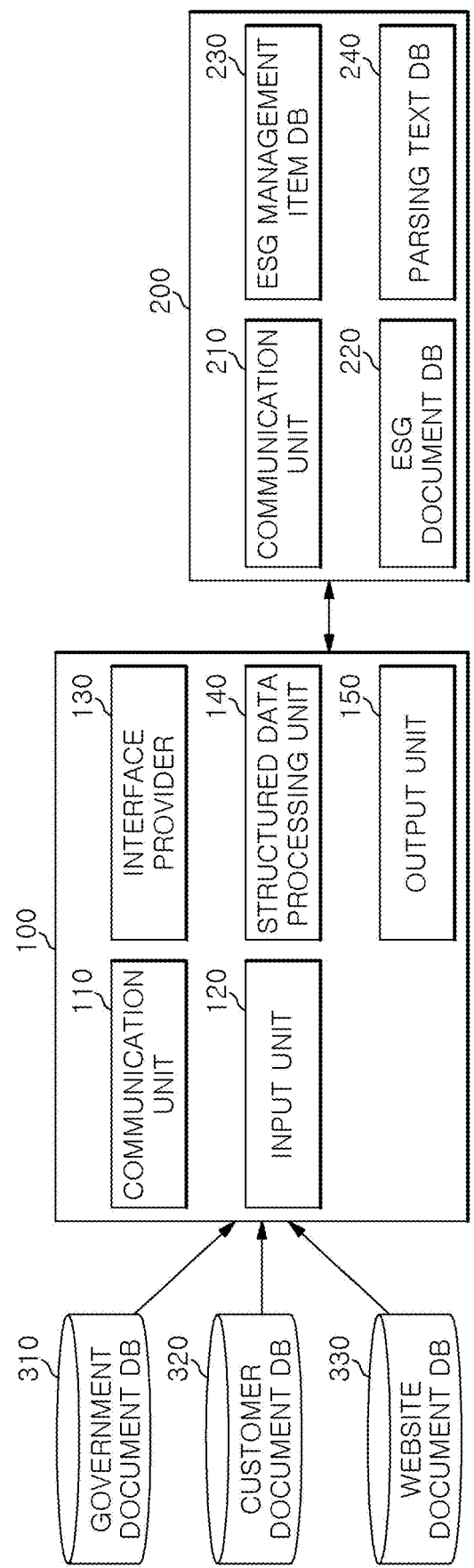

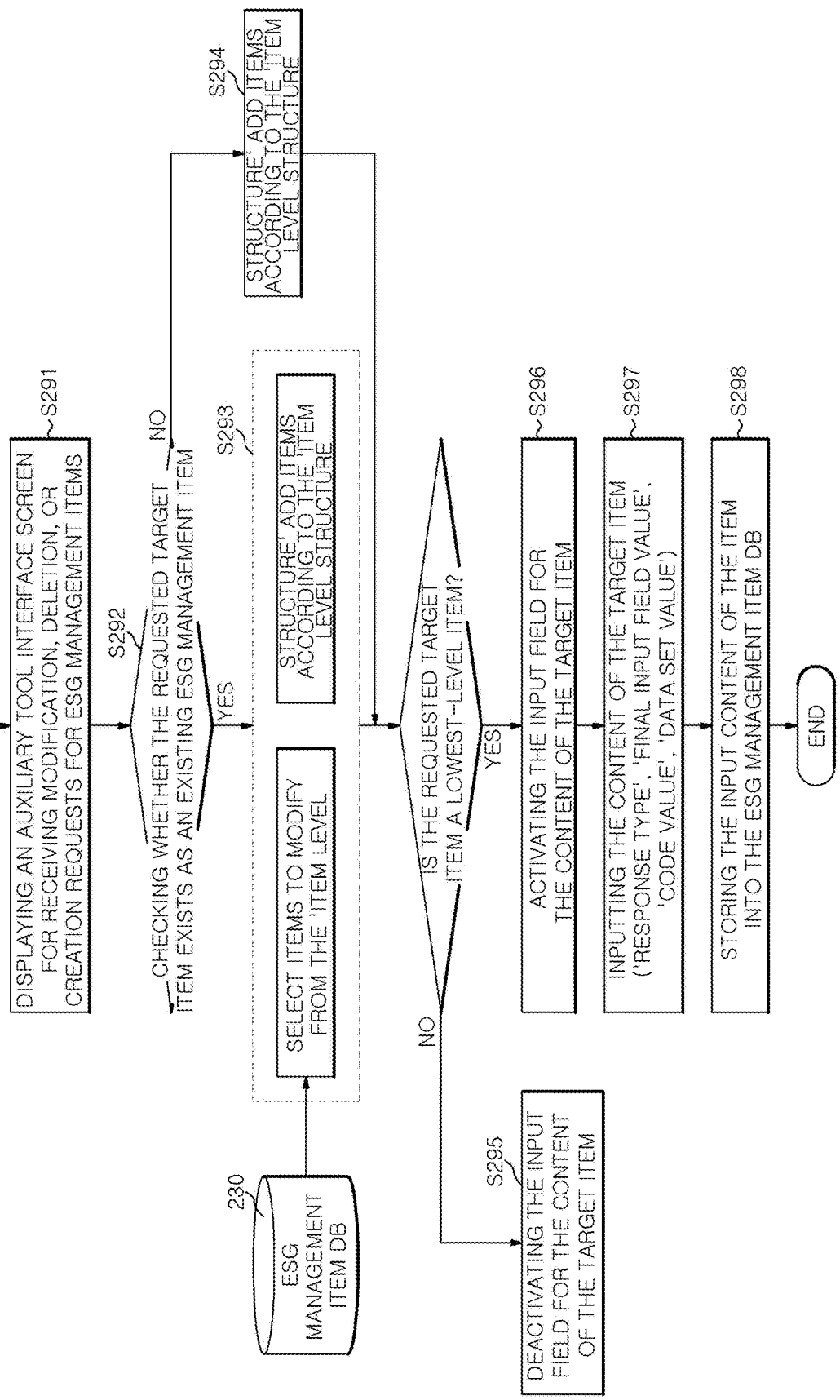

FIG.5

| | i-ESG | | SR Management \| Parsing Text Management \| Account Management | | | | |
|---|---|---|---|---|---|---|---|
| | Dashboard | | Administrator | | | | |
| | Diagnosis > | | SR Management | | | | |
| | Report | | | | | | |
| | SR Management ^ | | ::: SR Management > Item Management | | | | |
| | → SR Management | | | | | | |
| | → Parsing Text Management | | --Item LEVEL Structure | | | | |
| | → Account Management | | | | | | |

| Major Category | ⊞ | Level 2 | ⊞ | Level 3 | ⊞ | Level 4 | ⊞ | Level 5 |
|---|---|---|---|---|---|---|---|---|
| GRI | | GRI 100:Common Topics | | Organizational Profile | | | | |
| SASB | | GRI 200:Economic Performance | | Strategy | | | | |
| UN SDGs | | GRI 300:Environmental Performance | | Ethics and Integrity | | | | |
| TCFD | | GRI 400:Social Performance | | Governance | | | | |
| K-ESG | | | | Stakeholder Engagement | | | | |
| K-ESG(for Medium and Small Enterprises) | | | | Reporting Practice | | | | |
| GRI | | | | | | | | |

> Create New Report ESG
> Start ESG Diagnosis
> Start Materiality Issue Diagnosis
> Start Supply Chain Management The selected items are as follows ※ GRI > GRI 100: Common Topics > Organizational Profile > 102-1. Organization Name  [Modify Item ✎] [Delete item ⊗]

| Level 3 |
|---|
| 102-1 Organization Name |
| 102-2 Key Brands, Products and Services |
| 102-3 Headquarters Location |
| 102-4 Business Regions |
| 102-5 Ownership and Legal Form |
| 102-6 Market Areas |
| 102-7 Scale of the Organization |

▦ Response Type                    ▦ Final Input Field Value

☑ Text Input    ☐ O/X Selection    ☐ Select from List    unit:

▦ Writing Guide
  Please provide guidance on what content can be inserted in detail when writing the report.

[Add Media File ✎]

102-1.png
Lotte Himart, 2020
https://company.himart.co.kr/sustainability/ESGR...  ⊗

Data Set

FIG. 10 sentence_generate_1("Target Corporation is consistently performing active facility investment and activities to reduce greenhouse gases.")

Target Corporation is consistently performing active facility investment and activities to reduce greenhouse gases. Last year, LED lighting was installed in the production process and old facilities were replaced with high-efficiency facilities, and the 'Company-wide Energy Committee' was launched last year for harmful energy reduction activities. The Company-wide Energy Committee Target Corporation is consistently performing active facility investment and activities to reduce greenhouse gases. (Photo source: Electronic Trading System, 2019 Market Report) This is for low-carbon green growth and corporate value enhancement to respond to global greenhouse gas emission regulations Target Corporation is consistently performing active facility investment and activities to reduce greenhouse gases. In response to the national task of concluding climate change agreements, we continue to implement computerization for energy saving. We are making efforts to improve energy efficiency for greenhouse gas reduction, and eco-friendly products Target Corporation is consistently performing active facility investment and activities to reduce greenhouse gases. Through this, we plan to reduce greenhouse gas emissions to about 3% of the 2008 level by 2020, which is a 26% reduction compared to the projected greenhouse gas emissions. For the first time among Korean companies, in 2009

Target Corporation is consistently performing active facility investment and activities to reduce greenhouse gases. Through this, we are presenting a new position in the global climate goals of the 'Post-2020 New Climate Regime' being promoted worldwide and contributing to achieving national greenhouse gas reduction targets and energy-saving goals.

METHOD FOR ESTABLISHING ESG DATABASE WITH STRUCTURED ESG DATA USING ESG AUXILIARY TOOL AND ESG SERVICE PROVIDING SYSTEM PERFORMING THE SAME

CROSS-REFERENCE TO RELATED APPLICATIONS

This is a Bypass Continuation Application of International Application No. PCT/KR2023/011363 filed Aug. 2, 2023, claiming priority based on Korean Patent Application No. 10-2022-0097981 filed Aug. 5, 2022 and Korean Patent Application No. 10-2022-0097982 filed Aug. 5, 2022, the entire disclosures of which are incorporated herein by reference.

TECHNICAL FIELD

Embodiments of the present disclosure relate to a method for establishing an ESG database by organizing various unstructured formats of ESG data within non-standardized ESG documents into structured format ESG data using an ESG auxiliary tool and an ESG service providing system performing the same.

BACKGROUND ART

As companies pay more attention to risk management recently, they are evaluating businesses from multiple angles and applying these evaluation results to investment, mergers, production line risk management, and more.

Traditionally, companies were typically evaluated based on quantifiable financial data. However, recently, methodologies for evaluating companies and analyzing risks based on non-financial data have gained prominence. Financial data disclosed by companies often does not reflect unfavorable information about the company, and the reliability of financial reports provided by companies is also questionable. The reason why corporate analysis through non-financial data is necessary: As people actively communicate on the internet through SNS activities, corporate reputations can be negatively affected by events such as the spread of specific rumors about a company or product; as people's SNS activities through the internet become more active, corporate reputations can be shaken by events such as the spread of specific rumors about a company or product. Additionally, risks associated with a company may increase due to rumors related to corporate owners' crimes or health issues, but such events are difficult to analyze through financial data. Therefore, more precise corporate evaluation can be possible by analyzing companies through both financial and non-financial data.

In this context, a methodology that categorizes and analyzes non-financial data into three ESG (Environment, Social, Governance) topics has emerged.

Recently, due to crises such as climate change, corporate social responsibility has been emphasized further, and ESG evaluation methods have received more attention, which is confirmed by global ESG regulations.

In response to these rapidly changing external environment shifts, companies are disclosing data containing information about their ESG management activities to satisfy ESG evaluation methods in response to disclosure demands from various stakeholders. This data is commonly published and disclosed in the form of PDF documents, often referred to as Sustainability Reports (SR).

Such disclosure of ESG data by companies is increasing year by year, and the accumulation of corporate ESG data is growing. As corporate ESG management will become increasingly important in the future, demand for utilizing this accumulated ESG data from a big data perspective is gradually increasing.

However, ESG documents such as sustainability reports that companies disclose and publish are mostly unstructured data in PDF file format. To utilize this unstructured data in ESG documents from a big data perspective, it needs to be organized and stored in a structured format database.

DISCLOSURE

Technical Problem

To solve the aforementioned problems, embodiments of the present disclosure aim to provide a method for establishing an ESG database composed of structured ESG data using an ESG auxiliary tool that can store and manage companies' unstructured ESG data by structuring it, and an ESG service providing system performing the same.

Furthermore, embodiments of the present disclosure aim to provide a method for establishing an ESG database composed of structured ESG data using an ESG auxiliary tool capable of providing an interface screen for accurately converting unstructured ESG data into structured data, and an ESG service providing system performing the same.

Technical Solution

One aspect of the present disclosure provides a method for establishing an ESG database composed of structured ESG data using an ESG auxiliary tool that may be performed by one or more computing devices. The one or more computing devices are connected to an ESG management item database that has pre-stored multiple ESG management items.

The method may include: parsing an ESG document subject to structuring—the ESG document includes unstructured ESG data; screening whether the parsed ESG document includes items corresponding to at least one of the pre-stored plurality of ESG management items; designating a selection status for items in the ESG document based on whether an item corresponding to the ESG management item is included in the document; activating or deactivating input fields for final input field values for the pre-stored plurality of ESG management items according to the designation result of the selection status; and generating structured data by acquiring the content of items corresponding to ESG management items determined to be included in the document.

In one embodiment, the step of screening may determine whether the parsed ESG document includes the corresponding item based on at least one of code values and data set values for each ESG management item stored in the ESG management item database. Here, the "corresponding item" refers to an item within the unstructured ESG document that matches with the pre-defined standardized items in the ESG management item database through their code values or data set values. This screening process essentially identifies whether specific standardized ESG categories or metrics that are tracked in the database also appear somewhere in the document being analyzed.

In one embodiment, the method may further include determining whether there is any abnormality in the screening result. The step of determining whether there is any abnormality may be based on a user's confirmation input or may determine the abnormality of the screening result based on surrounding data for data matching at least one of the code values and data set values in the ESG document.

In one embodiment, the step of designating the selection status may designate the ESG document as a first selection status if the corresponding item is included in the parsed ESG document, and designate the ESG document as a second selection status if the corresponding item is not included.

In one embodiment, the step of generating structured data by acquiring the content of items corresponding to the ESG management items may include: providing the location of the ESG management item in the ESG document that is designated as the first selection status; acquiring the content of the corresponding ESG management item based on the provided location; and generating structured data by table-converting the list of selected ESG management items and the acquired content of each ESG management item.

In one embodiment, the step of acquiring the content of the corresponding ESG management item may acquire the content of the 'final field input value' based on the user's content input or based on surrounding data for the provided location.

In one embodiment, the one or more computing devices may be further connected to an ESG document database that stores structured ESG data converted from unstructured ESG data of other ESG documents. The step of generating structured data by acquiring the content of items corresponding to the ESG management items may further include acquiring data from the other ESG document as content for the corresponding item if a user input indicating the use of existing ESG document data is received.

In one embodiment, the method may further include managing already stored ESG management items. The management of ESG management items may include modifying, deleting, or creating. The step of managing ESG management items may include: confirming whether already stored ESG management items have been saved; if saved, receiving a request for modification, deletion, or creation of ESG management items; if the modification, deletion, or creation request is received, displaying an auxiliary tool interface screen showing the stored ESG management item set in an item level structure.

In one embodiment, the step of managing ESG management items may further include: deactivating the input field for the content of the target item if the requested target item is not a lowest-level item; activating the input field for the content of the target item if the requested target item is a lowest-level item; receiving input for the content of the target item to be modified or created through the activated input field; and storing the content of the input item in the ESG management item database.

In one embodiment, the step of receiving input for the content of the target item through the activated input field may include providing an auxiliary tool interface screen for receiving the content of the target item. The auxiliary tool interface screen includes a first sub-area containing the activated input field and a second sub-area containing the item structure level, and in the second sub-area, item sets by major category are displayed classified by the same item levels.

Another aspect of the present disclosure provides a computer-readable recording medium on which a program for performing the method for establishing an ESG database composed of structured ESG data using an ESG auxiliary tool according to the embodiments described above is recorded.

Yet another aspect of the present disclosure provides an electronic device for establishing an ESG database composed of structured ESG data using an ESG auxiliary tool that may be connected to an ESG management item database with pre-stored multiple ESG management items. The electronic device may include: a structured data processor configured to generate structured ESG data for the ESG document by acquiring items corresponding to at least one of the plurality of ESG management items pre-stored in the ESG management item database and the content of the corresponding items from the ESG document containing unstructured ESG data; and an interface provider that provides an auxiliary tool interface screen through an output unit for receiving user input to convert unstructured data in ESG documents into structured data.

Advantageous Effects

According to one aspect of the present disclosure, the ESG service providing system can reduce the inefficiency of existing manual work and overcome the limitations of constraints that make full automation difficult by using an ESG auxiliary tool that provides a unique auxiliary tool interface screen. The auxiliary tool interface screen provides the effect of efficiently performing classification, storage, and management of data within ESG documents.

As a result, the ESG service providing system can collect, transform, store, and manage ESG data from corporate sustainability reports and understand the company's ESG management status based on this data. In particular, as unstructured ESG data is parsed and structured through the process of the auxiliary tool and built into a database, ESG data can be appropriately utilized for analysis and processing from a big data perspective.

The objectives of the present disclosure are not limited to those mentioned above, and other objectives not mentioned will be clearly understood by those skilled in the art from the following description.

DESCRIPTION OF DRAWINGS

To explain the technical solutions of embodiments of the present disclosure or prior art more clearly, drawings necessary for the description of embodiments are briefly introduced below. The drawings below should be understood as being for the purpose of explaining embodiments of this specification, not for limitation purposes. Also, for clarity of explanation, various modifications such as exaggeration, omission, etc. may be applied to some elements shown in the drawings below.

FIG. 1 is a schematic diagram of an ESG service providing system according to one aspect of the present disclosure.

FIG. 4 is a flow diagram of a process for managing ESG management items according to one embodiment of the present disclosure.

FIG. 5 illustrates an auxiliary tool interface screen displaying an item level structure according to one embodiment of the present disclosure.

FIG. 10 illustrates output results of a corpus of recommended text according to one embodiment of the present disclosure.

MODES OF THE INVENTION

Figure 2A:
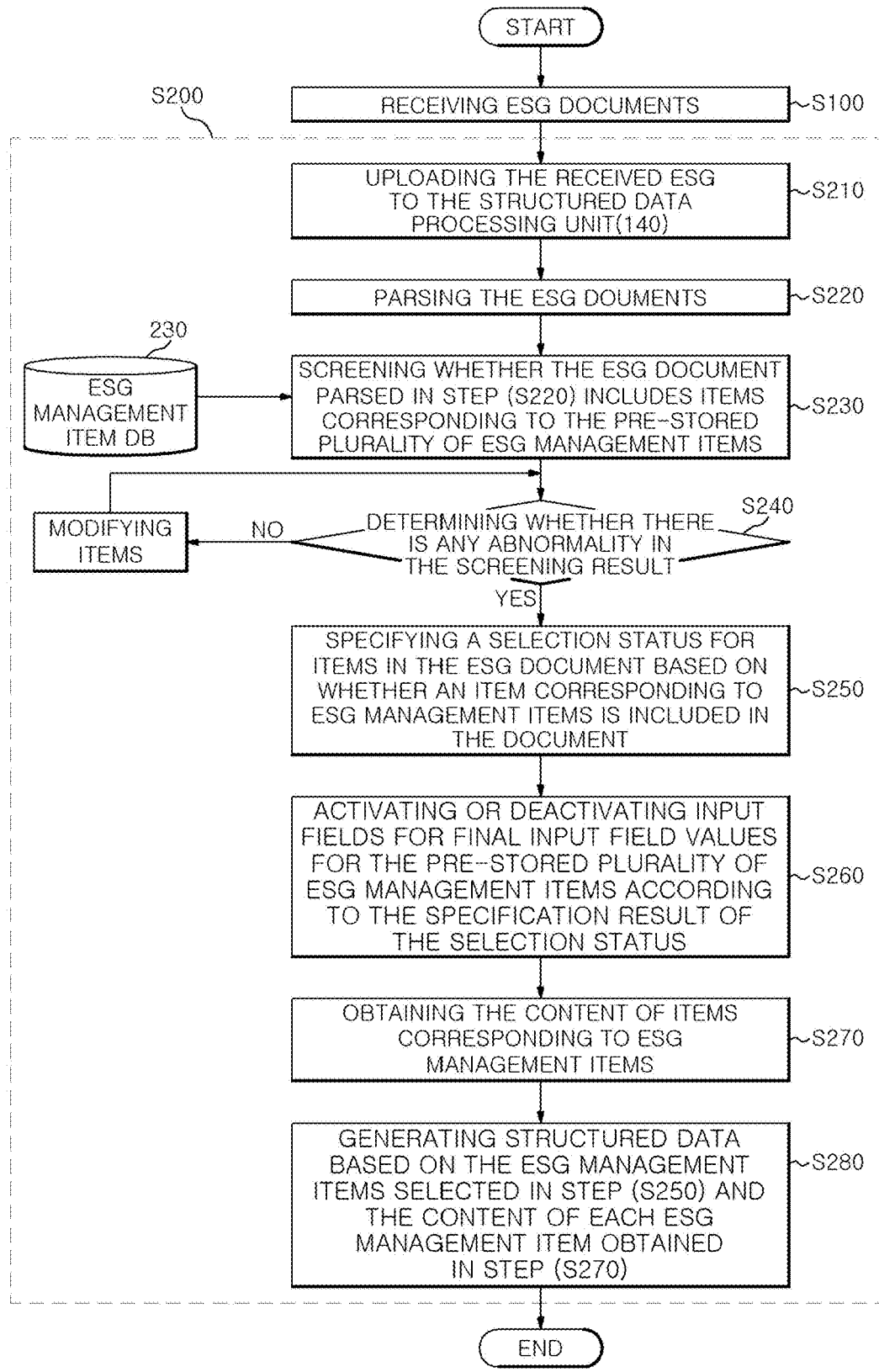
FIGS. 2a and 2b are flow diagrams of a method for establishing an ESG database composed of structured ESG data using an ESG auxiliary tool according to another aspect of the present disclosure.

Hereinafter, embodiments of the present disclosure will be examined in detail with reference to the drawings.

However, this is not intended to limit the present disclosure to specific embodiments, and should be understood to include various modifications, equivalents, and/or alternatives of the embodiments of the present disclosure. In connection with the description of the drawings, similar reference numerals may be used for similar components.

In this specification, expressions such as "have," "may have," "include," or "may include" indicate the presence of the corresponding feature (e.g., component such as a numerical value, function, operation, step, part, element, and/or component) and do not exclude the presence or addition of additional features.

When a component is mentioned as being "connected" or "coupled" to another component, it should be understood that the component may be directly connected or coupled to the other component, but other components may also exist in between. In contrast, when a component is mentioned as being "directly connected" or "directly coupled" to another component, it should be understood that there are no other components in between.

Expressions such as "first," "second," "primary," or "secondary" used in various embodiments may modify various components regardless of order and/or importance, and do not limit the corresponding components. These expressions may be used to distinguish one component from another component. For example, a first component and a second component may represent different components, regardless of order or importance.

Singular expressions include plural expressions unless the context clearly indicates otherwise.

The expression "configured to" used in this specification may be replaced, depending on the context, with, for example, "suitable for," "having the capacity to," "designed to," "adapted to," "made to," or "capable of." The term "configured to" does not necessarily mean only "specifically designed to" in hardware. Instead, in some situations, the expression "device configured to" may mean that the device "can" do something together with other devices or components. For example, the phrase "processor configured to perform A, B, and C" may mean a dedicated processor (e.g., embedded processor) for performing the corresponding operations, or a generic-purpose processor (e.g., CPU or application processor) that can perform the corresponding operations by executing one or more software programs stored in a memory device.

FIG. 1 is a schematic diagram of an ESG service providing system according to one aspect of the present disclosure.

According to embodiments, the ESG service providing system (1) may have aspects that are entirely hardware, entirely software, or partially hardware and partially software. For example, the system may collectively refer to hardware equipped with data processing capability and operating software to drive it. In this specification, terms such as "unit," "system," and "device" are intended to refer to a combination of hardware and software driven by the hardware. For example, hardware may be a data processing device including a CPU (Central Processing Unit), GPU (Graphic Processing Unit), or other processor. Additionally, software may refer to running processes, objects, executables, threads of execution, programs, etc.

Referring to FIG. 1, the ESG service provided by the ESG service providing system (1) includes a structuring auxiliary tool service that changes unstructured format ESG data in ESG documents to structured format. To provide this service, the ESG service providing system (1) includes an electronic device (100) connected to a database server (200).

The database server (200) includes a communication unit (210) and one or more repositories. In specific embodiments, the database server (200) may include one or more repositories among ESG document DB (220), ESG management item DB (230), and parsing text DB (240).

The communication unit (210) is configured to transmit and receive data through wired/wireless electrical communications with external devices such as the electronic device (100). The database server (200) may store data in one or more repositories through the communication unit (210) or provide stored data to external devices.

The communication unit (210) may be referred to as a transmitter, receiver, transceiver, communication unit, communication modem, or communication circuit. The communication unit (210) may support at least one of various wireless communication standards including wired connection systems and wireless connection systems such as IEEE (Institute of Electrical and Electronics Engineers) 802.xx systems, IEEE Wi-Fi systems, 3GPP (3rd Generation Partnership Project) systems, 3GPP LTE (Long Term Evolution) systems, 3GPP 5G NR (New Radio) systems, 3GPP2 systems, Bluetooth, etc.

The ESG document DB (220) stores data that has been structured from ESG documents obtained by the structured data processor (140) described below. In some embodiments, the ESG document DB (220) may store items and their values for each ESG document that has been table-converted by the structured data processor (140).

The table-converted result data stored in the ESG document DB (220) is described in more detail below with reference to the structured data processor (140).

The ESG management item DB (230) stores management items required for converting unstructured ESG data into structured data.

In some embodiments, the ESG management item DB (230) may store item sets for one or more major categories. The major categories consist of report writing standards and ESG topic pools. In some embodiments, the major categories may include sustainability report disclosure standards such as GRI (Global Reporting Initiative), SASB (Sustainability Accounting Standards Board), TCFD (Task Force on Climate-Related Financial Disclosures), UN SDGs (UN Sustainable Development Goals), and industry-specific materiality topics and standards provided by the Ministry of Trade, Industry and Energy's ESG guidelines (also referred to as K-ESG).

For example, the ESG management item DB (230) may store major categories consisting of GRI, SASB, TCFD, UN-SDGs, K-ESG, and/or other standards.

The item set for each major category may include ESG keywords and ESG topic items required to be written according to the standards and topics of the corresponding major category. The item set for each major category may include topic items that are common to each major category (common topic items). Also, the item set for each major category may include multiple other items unique to individual major categories. For example, the item set for the GRI major category may include document items such as GRI200, GRI300, and GRI400.

The ESG management item DB (230) may store each item in the item set with its corresponding code value and/or data set value. Here, code values and data set values are values that indicate management items.

In some embodiments, the item set for the major categories may be further classified based on the industry of the target company. Even when the same major category is applied, the item set may differ depending on the industry group of the target company. For example, SASB selected "information security" as an important topic for the healthcare industry, while it did not select it as an important topic for the power industry. Therefore, when SASB is applied to a target company in the healthcare industry, "information security" keywords and related items may be used to extract corresponding unstructured ESG data, but when SASB is applied to a target company in the power industry, "information security" keywords and related items may not be used to extract corresponding unstructured ESG data.

In some embodiments, multiple items in the ESG document may be specified in a hierarchical structure. Each item in the item set of each major category may be further classified from the highest level to the lowest level. For example, in the item set of the GRI major category, the highest level (Level 1) may include common topics, GRI200, GRI300, and GRI400. The next level (Level 2) from Level 1 of common topics may include organizational profile, strategy, and governance. The next level (Level 3) from Level 2 of organizational profile may include organizational size and employees. The next level (Level 4) from Level 3 of organizational size may include number of domestic employees, number of overseas employees, number of business sites, and net sales.

The ESG document items and the ESG management item DB (230) that stores them are described in more detail below in FIG. 2a.

The parsing text DB (240) stores the text of parsed ESG documents. In some embodiments, the text of the parsed ESG documents may be obtained from the structured data processor (140) described below.

The text of the parsed ESG documents is described in more detail below with reference to the structured data processor (140).

The electronic device (100) may be, for example, a laptop computer, other computing device, tablet, cellular phone, smartphone, smartwatch, smart glasses, head-mounted display (HMD), other mobile device, or other wearable device.

The electronic device (100) includes an auxiliary tool for structuring unstructured ESG data. The electronic device (100) is configured to extract unstructured ESG data included in acquired ESG documents and structure the extracted unstructured ESG data using the auxiliary tool.

Additionally, the electronic device (100) is configured to support building a database by supplying the structured ESG data to the database server (200).

The electronic device (100), as a client terminal device communicating with the service server (200), includes at least one processor that can process data, memory that stores data, and a communication unit that transmits/receives data.

In specific embodiments, the electronic device (100) may include, as shown in FIG. 1, a communication unit (110), an input unit (120), an interface provider (130), a structured data processor (140), and an output unit (150).

The communication unit (110) is configured to transmit and receive data through wired/wireless electrical communications with external devices such as the database server (200). The electronic device (100) may provide data to the input unit (120), the interface provider (130), the structured data processor (140), and the output unit (150) through the communication unit (110), or provide processing results to external devices.

Since the communication unit (110) is similar to the communication unit (210), detailed description is omitted. The description of the communication unit (110) focuses on differences from the communication unit (210).

The communication unit (110) is configured to receive ESG documents containing unstructured ESG data. A user may collect multiple ESG documents from web pages through the communication unit (110) and upload them to the input unit (120).

The ESG documents include ESG sustainability reports of domestic and foreign target companies already disclosed on government web pages, corporate web pages, other websites, etc., or other ESG documents prepared and distributed by ESG managers of individual companies. The target company may refer not only to businesses as companies but also encompass various types of organizations such as institutions and non-profit organizations.

The ESG documents may also be collected from databases disclosed on the company's homepage, government portals, etc.

In some embodiments, the ESG documents may be obtained from one or more external DBs among government document DB (310), customer document DB (320), and website document DB (330).

The government document DB (310) may collect ESG documents for at least one company searched by accessing government data portals.

The customer document DB (320) may collect ESG documents for relevant customers by accessing the data portal of a customer related to the system (1), for example, a customer company subscribed to the service provided by the system (1). Multiple ESG documents may be collected for a single customer.

The website document DB (330) may access one or more websites pre-designated as major websites and collect ESG documents disclosed on the accessed websites by searching.

The ESG data represents information describing the ESG status of the target company that created the document. The ESG document may be a Portable Document Format (PDF) document, but is not limited to this.

The unstructured ESG data is data representing ESG information in an unstructured format. Unstructured data is data that does not have a structure recognizable by the database server (200). The unstructured ESG data may include unstructured text and images.

The input unit (120), interface provider (130), and structured data processor (140) may be implemented with at least one processor.

The input unit (120) is configured to supply ESG documents containing unstructured ESG data input from the communication unit (110) to the structured data processor (140).

The interface provider (130) is configured to receive user input for changing unstructured data in ESG documents into structured data. The interface provider (130) is configured to allow users to modify the content of ESG items, code values, data set values, response content, and/or final input field values.

In some embodiments, the interface provider (130) may be configured to search for the location of items to which user input will be applied in the document based on code values and data set values in the ESG management item DB (230) of the database server (200), and to control the output device to move the screen to that location or to a page containing it.

In some embodiments, the interface provider (130) may provide an auxiliary tool interface screen for users to directly modify items if there are abnormalities in the selection processing results. The auxiliary tool interface screen is configured to receive modification inputs for items and other elements.

The operation of the interface provider (130) is described in more detail below with reference to FIG. 2.

The structured data processor (140) is configured to generate structured ESG data for the ESG document by obtaining items corresponding to the plurality of ESG management items pre-stored in the ESG management item DB (230) of the database server (200) and the content of those items from within the ESG document.

The structured data processor (140) is configured to parse the ESG document (for example, PDF data of a sustainability report).

Additionally, the structured data processor (140) is configured to search for corresponding items in the document based on the plurality of ESG management items pre-stored in the ESG management item DB (230), and to obtain the content of those items using the auxiliary tool.

The operation of this structured data processor (140) is described in more detail below with reference to FIG. 2.

The output unit (150) may include one or more of a display or speaker. The output unit (150) can output content according to the control of the processor, or the interface provider (130), or the structured data processor (140). The display can show information processed in the electronic device (110) as images. For example, the display can show execution screen information of applications running on the electronic device (100), or UI (User Interface) or GUI (Graphic User Interface) information according to such execution screen information. The display may include, for example, LCD, OLED, flexible display, other display components, etc.

In many embodiments, the display may be implemented as a touch panel formed in an integrated manner or in a mutual layer structure with a touch sensor, which may simultaneously provide input interface screens and output interface screens. Touch input is entered by a pointing object (for example, including a user's body or tool).

The output unit (150) is configured to display the auxiliary tool interface screen provided by the interface provider (130). The output unit (150) may display input fields for modifying information about items, etc.

Additionally, the output unit (150) may output ESG images. Also, the output unit (150) may output parsed text. In some embodiments, the output unit (150) may output ESG document images in one part of the output unit (150) screen (for example, one side of the screen) and output parsed text in another part (for example, the top of the screen).

Figure 2B:
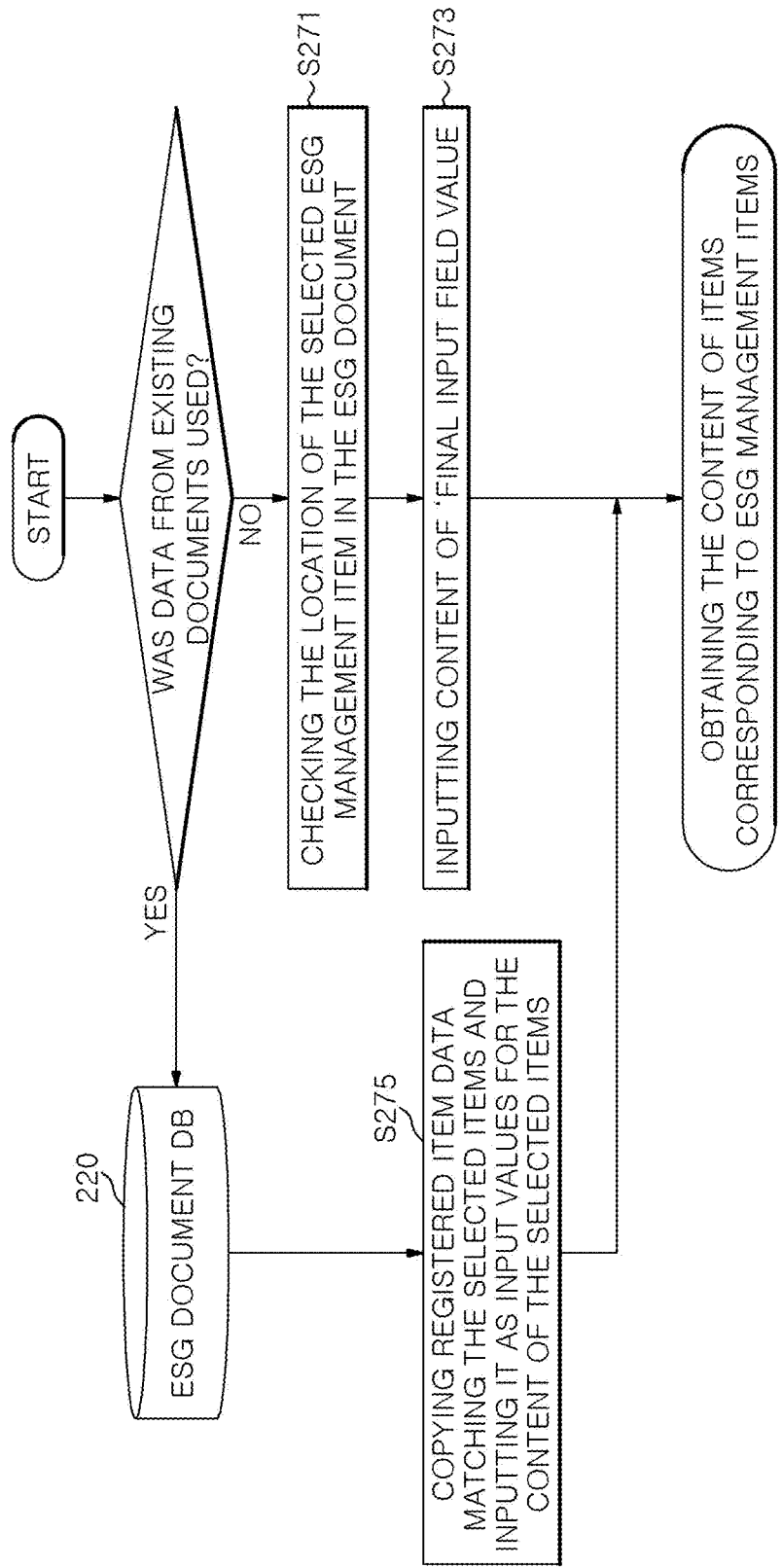

FIG. 2a and FIG. 2b are flow diagrams of a method for establishing an ESG database composed of structured ESG data using an ESG auxiliary tool according to another aspect of the present disclosure.

The method of FIGS. 2a and 2b may be performed by one or more computing devices such as the ESG service providing system of FIG. 1.

Referring to FIG. 2a, the method includes a step (S100) of receiving ESG documents (for example, by the communication unit (110)).

Multiple ESG documents may be collected in step (S100).

Additionally, the method may include a step (S200) of generating structured ESG data by parsing the ESG documents received in step (S100) and obtaining data of items corresponding to pre-stored management items included in the parsed ESG document (for example, by the structured data processor (140)).

Step (S200) includes uploading the ESG documents received in step (S100) to the structured data processor (140) (S210); and parsing the ESG documents (S220).

The structured data processor (140) is configured to parse the ESG documents (for example, PDF data of sustainability reports). In some embodiments, the structured data processor (140) may include a parsing tool. The structured data processor (140) may parse unstructured data using the parsing tool. The parsing tool may be PDFMiner, but is not limited to this.

For example, the structured data processor (140) may apply the parsing tool to ESG documents in PDF format to generate parsed PDF data. The parsing tool may extract text blocks containing one or more lines of text, images, and/or geometric shapes from ESG documents in PDF format.

In some embodiments, the extracted text blocks may have at least one attribute among text, bounding box, and text line attributes. For example, the parsed PDF data may include extracted text blocks, and each text block may include one or more text lines.

In some embodiments, each text line may have at least one attribute among the text of the corresponding line and the attributes of the bounding box surrounding the line. The bounding box of the text block or text line is a box around the text block or text line that defines the area of the page generally occupied by each text block or text line. The bounding box may refer to a rectangular-shaped box.

In some embodiments, if the unstructured ESG data includes image data, the structured data processor (140) may be further configured to recognize unstructured text by performing OCR (Optical Character Recognition) processing on the image data of the ESG document before parsing. In some embodiments, the parsing tool may be configured to enable OCR processing. Then, by performing OCR processing and parsing processing simultaneously using the parsing tool, text in text boxes can be recognized and the structure (for example, text attributes) within the PDF page where text has been recognized can be analyzed.

Images extracted by the parsing tool may be associated with their respective bounding boxes.

Geometric shapes extracted by the parsing tool may include, for example, lines, curves, rectangles, and other shape objects appearing in tables and vector drawings. The parsing tool may find and extract bounding boxes around images and tables on PDF pages.

Thus, the parsing results of the structured data processor (140) may include various bounding boxes that define the areas or sections of the ESG PDF document pages occupied by text blocks, text lines, images, and/or geometric shapes.

In some embodiments, the structured data processor (140) may transmit the text of the parsed ESG document included in the parsing results to the database server (200) to be stored in the parsing text DB (240).

Additionally, the method includes a step (S230) of screening whether the ESG document parsed in step (S220) includes items corresponding to at least one of the pre-stored plurality of ESG management items.

In some embodiments, step (S230) may determine whether the parsed ESG document includes the corresponding item based on code values and/or data set values for each ESG management item stored in the ESG management item DB (230).

In these embodiments, the structured data processor (140) is configured to perform a screening operation that determines whether the parsed ESG document includes the corresponding item based on code values and/or data set values stored in the ESG management item DB (230). Here, the "corresponding item" refers to an item within the unstructured ESG document that matches with the pre-defined standardized items in the ESG management item database through their code values or data set values. This screening process essentially identifies whether specific standardized ESG categories or metrics that are tracked in the database also appear somewhere in the document being analyzed.

The ESG management item DB (230) stores multiple ESG management items. Each ESG management item may include at least one code value and/or at least one data set value. Then, the code values and data set values that make up the ESG document items stored in the ESG management item DB (230) may be used as criteria for determining whether the parsed ESG document includes the corresponding stored items.

The structured data processor (140) determines that the parsed ESG document has at least one of the ESG document items stored in the ESG management item DB (230) when code values or data set values stored in the ESG management item DB (230) are found in the parsed ESG document. The item corresponding to the found code values or data set values is determined to be included in the parsed ESG document.

Then, in step (S230), the structured data processor (140) may obtain a list of ESG management items that are presumed to be included in the parsed ESG document. Each item value in the list is expressed by code values and/or data set values stored in the ESG management item DB (230).

In some embodiments, the method may further include a step (S240) of determining whether there is any abnormality in the screening result. Step (S240) may be performed before step (S250) described below.

Here, an abnormal screening result indicates an incorrect selection as an ESG management item when it is not actually an ESG management item in the ESG document.

Even if code values and/or data set values matching those corresponding to pre-stored ESG management items are found in the ESG document, the found values may actually be data unrelated to ESG management items in the document. For example, ESG management items according to GRI standards have a structure in which "3-digit number," "hyphen (-)," and "1 or 2-digit number" are sequentially arranged, such as 102-1. The ESG document may coincidentally include separate data with the same structure that is not an ESG management item according to GRI standards. In this case, data unrelated to ESG management items may be found as a result of matching to code values and/or data set values, and then the structured data processor (140) may produce a screening result indicating that the ESG document includes ESG management items.

In some embodiments, step (S240) may determine whether there is an abnormality in the screening result based on the user's confirmation input and/or surrounding data for data matching code values and/or data set values in the ESG document.

The structured data processor (140) may provide the location of data matching code values and/or data set values corresponding to pre-stored ESG management items, and may determine that there is no abnormality if a confirmation input is received for the provided location (S240). When the structured data processor (140) supplies the location of matching data to the interface provider (130), the interface provider (130) may display an auxiliary tool interface screen including the location of matching data to prompt user input confirming whether the data at each location is an ESG management item (S240).

Additionally, the structured data processor (140) may determine whether the matching data corresponds to an ESG management item based on surrounding data placed within a certain range based on the location of data matching code values and/or data set values corresponding to pre-stored ESG management items (S240).

Additionally, step (S240) may include a step of modifying at least part of the selection results determined to be included in the ESG document if there are abnormalities.

If the structured data processor (140) determines that there are abnormalities in the screening results in step (S240), the interface provider (130) may provide an auxiliary tool interface screen for modifying data with abnormal screening results. The auxiliary tool interface screen is configured to receive input for removing data incorrectly selected as ESG management items from the selection results. The structured data processor (140) may receive this removal input to modify the selection results and make a final selection of the ESG management item list to be converted into structured data.

Additionally, the method includes a step (S250) of specifying a selection status for items in the ESG document based on whether an item corresponding to ESG management items stored in the ESG management item DB (230) is included in the document. In some embodiments, step (S250) may be performed if there are no abnormalities in the screening results in step (S240).

In step (S250), to specify the selection status of the parsed ESG document, the data processor (140) may specify the ESG document as a first selection status if the corresponding item is included in the parsed ESG document, and specify the ESG document as a second selection status if the corresponding item is not included.

In some embodiments, the step (S250) of specifying the selection status of the ESG document may be implemented by turning on/off checkboxes indicating selection status. In these embodiments, specifying the first selection status or second selection status may be implemented by turning on/off checkboxes indicating selection status. For example, the structured data processor (140) may specify the ESG document as the first selection status by turning on a checkbox if the corresponding item is included in the parsed ESG document, and specify the ESG document as the second selection status by turning off the checkbox if the corresponding item is not included.

Additionally, the method includes a step (S260) of activating or deactivating input fields for final input field values for the pre-stored plurality of ESG management items according to the specification result of the selection status.

In some embodiments, the structured data processor (140) may receive a signal from the interface provider (130) indicating that there are no abnormalities in the selection processing results. The activation/deactivation of input fields for the 'final input field values' of the corresponding items may be performed in response to the receipt of this signal (S260).

When the structured data processor (140) receives a signal indicating that there are no abnormalities in the selection processing, it may activate the input field for the 'final input field value' of the corresponding item if it has been specified as the first selection status by turning on the checkbox, or deactivate the input field for the 'final input field value' of the corresponding item if it has been specified as the second selection status by turning off the checkbox.

In step (S260), the structured data processor (140) may activate or deactivate the input fields for the 'final input field value' of corresponding items determined to be included in the document. The result of activating or deactivating the input fields may be provided through an auxiliary tool interface screen.

Figure 3:
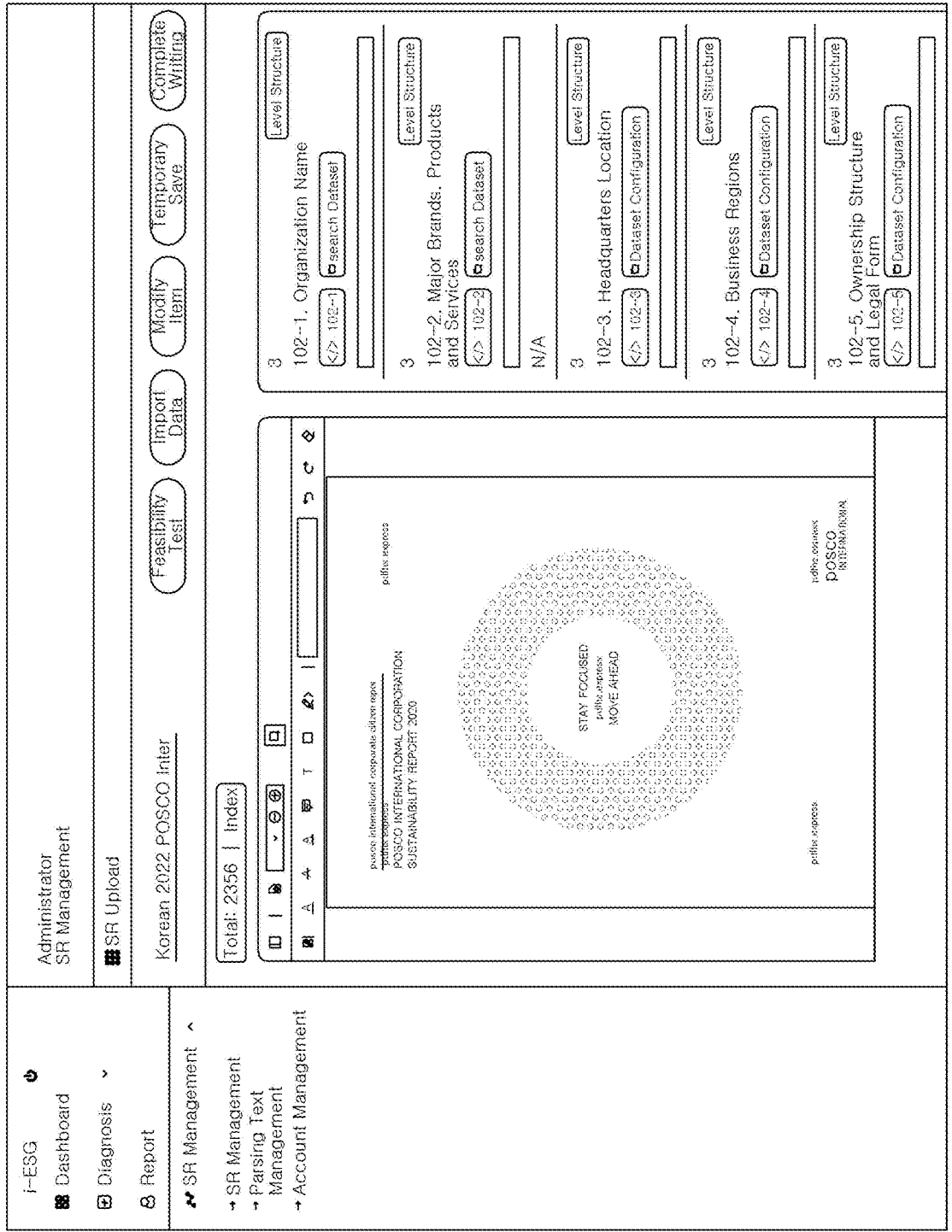
FIG. 3 illustrates an auxiliary tool interface screen including input fields for final input field values of items according to one embodiment of the present disclosure.

FIG. 3 illustrates an auxiliary tool interface screen including input fields for final input field values of items according to one embodiment of the present disclosure.

Referring to FIG. 3, the auxiliary tool interface screen may include corresponding items determined to be included in the document.

Referring back to FIG. 2, the method includes a step (S270) of obtaining the content of items corresponding to ESG management items determined to be included in the document.

FIG. 2*b* is a detailed flow diagram of step (S270) of FIG. 2*a*.

The structured data processor (140) is configured to obtain input values for ESG management items specified as the first selection status.

For items corresponding to ESG management items specified as the first selection status, the structured data processor (140) may extract data from the parsed ESG document or from other registered ESG documents to obtain their content.

The structured data processor (140) may copy the registered value of a registered item matching the ESG management item corresponding to an item included in the document from among items registered in the ESG document DB (220) as the input value for the item content included in the parsed ESG document. Then, for these specific items, the structured data processor (140) can directly utilize the registered data of the specific item from other ESG documents stored in the database server (200) instead of data recognized in the parsed ESG document (for example, recorded values).

Alternatively, the structured data processor (140) may receive input values for items in the ESG document through an auxiliary tool interface screen provided by the interface provider (130).

In some embodiments, step (S270) includes: providing the location of the ESG management item in the ESG document that is specified as the first selection status (S271); and obtaining the content of the corresponding ESG management item based on the provided location (S273).

Also, in some embodiments, step (S273) may obtain the content of the 'final field input value' based on the user's content input or based on surrounding data for the provided location.

The structured data processor (140) may provide the location of data matching code values and/or data set values corresponding to pre-stored ESG management items, and may obtain the input value as the content of the 'final field input value' when a user's content input for the ESG management item at the provided location is received. When the structured data processor (140) supplies the location of matching data to the interface provider (130), the interface provider (130) may display an auxiliary tool interface screen including the location of matching data to prompt user input for the content of the corresponding item (S270).

Additionally, the structured data processor (140) may determine whether the matching data actually corresponds to an ESG management item based on surrounding data placed within a certain range based on the provided location (S270). The range is set based on the text placement structure (for example, text blocks, text lines, etc.) and the number of texts around the corresponding location. For example, the range may be the text block below the provided location. Then, the content of the corresponding item may be obtained as part or all of the text within the text block below.

In some embodiments, step (S270) may further include: acquiring data from existing ESG documents as content for the corresponding item if a user input indicating the use of existing ESG document data is received (S275). Steps (S271, S273) may be performed after receiving user input indicating not to use data from existing ESG documents.

The existing ESG documents include previous ESG documents of the target company.

ESG documents are typically generated by a single target company in chronological order. Since changes in target companies are relatively slow, ESG documents with near-term differences (for example, quarterly, semi-annual, annual) may have the same content for partially identical items. In this case, the structured data processor (140) may use the data from existing ESG documents directly for the newly created ESG document.

Additionally, the method includes a step (S280) of generating structured data by table-converting the list of ESG management items selected in step (S250) and the content of each ESG management item obtained in step (S270).

The structured data generated in step (S280) is unstructured ESG data converted to have a data structure recognizable by the ESG service providing system (1).

The content obtained in step (S270) is mapped to each of the ESG management items selected in step (S250). Then, it may be converted into structured data by being table-converted into a table consisting of item, content values in the structured data processor (140).

The structured data processor (140) may transmit the table conversion processing result as structured data to the database server (200) to be stored in the ESG management item DB (230).

Referring back to FIG. 1, the ESG service providing system (1) may be further configured to perform a series of management operations that modify, delete, or create already stored ESG management items.

FIG. 4 is a flow diagram of a process for managing ESG management items according to one embodiment of the present disclosure.

Referring to FIG. 4, the process includes a step (S291) of displaying an auxiliary tool interface screen for receiving modification, deletion, or creation requests for ESG management items.

In some embodiments, the display of the auxiliary tool interface screen may be performed according to an operation initiating the management function for ESG management items.

The auxiliary tool interface screen is configured to prompt the selection of items to be modified or deleted and/or to promote the creation of new target items based on the relationship structure with existing items.

FIG. 5 illustrates an auxiliary tool interface screen displaying an item level structure according to one embodiment of the present disclosure.

Referring to FIG. 5, the auxiliary tool interface screen may display item sets by major category classified by the same item levels.

Referring back to FIG. 4, the process includes: confirming whether already stored ESG management items have been saved (S292); if ESG management items have been saved, receiving a request for modification, deletion, or creation of ESG management items (S293); and if ESG management items have not been saved, receiving a creation request for ESG management items (S294).

The electronic device (100) may receive selection of items to be modified or deleted through the auxiliary tool interface screen of FIG. 5, and may modify the content of the target items or delete the target items from the ESG management item DB (230). Alternatively, new target items may be added based on the item level structure.

In step (S293), the electronic device (100) may receive an item modification request by selecting an item to be modified from the 'item level structure' displayed on the auxiliary tool interface screen of FIG. 5.

In step (S293), the creation request is adding a new management item to the existing ESG management item set. The electronic device (100) may receive an item addition request according to the 'item level structure' displayed on the auxiliary tool interface screen of FIG. 5.

The item modification request, item addition request, etc. are received through the auxiliary tool interface screen, and then the electronic device (100) obtains the item level of the selected item.

In step (S294), the creation request is establishing a new ESG management item. Since this is similar to the item addition in step (S293), a detailed explanation is omitted.

Additionally, in some embodiments, the process of FIG. 5 may further include a step of activating or deactivating input fields depending on whether the requested target item in step (S293) is a lowest-level item.

The step of activating or deactivating includes: deactivating the input field for the content of the target item if the requested target item in steps (S293, S294) is not a lowest-level item (S295); and activating the input field for the content of the target item if the requested target item in steps (S293, S294) is a lowest-level item (S296).

In step (S296), one or more item information among 'response type' for the item, 'final input field value' of the item content, 'code value' to represent the item, and 'data set value' may be received through the input field.

The interface provider (130) may provide an auxiliary tool interface screen for receiving the content of the target item, such as one or more item information among 'response type' for the item, 'final input field value' of the item content, 'code value' to represent the item, and 'data set value'.

In some embodiments, the auxiliary tool interface screen may include a first sub-area containing the activated input field and a second sub-area containing the item structure level. Inputs for 'response type', 'final input field value', 'code value', and 'data set value' may be located at the bottom of the auxiliary tool interface screen of FIG. 5 (i.e., the first sub-area). In the second sub-area, item sets by major category are displayed classified by the same item levels.

Additionally, the process may further include, after step (S296): receiving input for the content of the target item to be modified or created through the activated input field (S297); and storing the content of the item input in step (S297) in the ESG management item DB (230) (S298).

In this way, as unstructured ESG data is parsed and structured by the ESG service providing system (1) and built into a database, ESG data can be appropriately utilized for analysis and processing from a big data perspective.

Additionally, the text of parsed ESG documents may be used as training data for machine learning models for auto-completing ESG documents. For this purpose, the ESG service providing system (1) may be connected to a system configured to recommend appropriate text for auto-completing ESG documents and may provide the text of the parsed ESG documents.

Furthermore, in some embodiments, the ESG service providing system (1) may provide structured processing results (for example, matched ESG management item values) corresponding to the text of parsed ESG documents to the system configured to recommend appropriate text for auto-completing ESG documents.

At least one of the provided text or structured processing results may be used for training the ESG auto-completion model.

Figure 6:
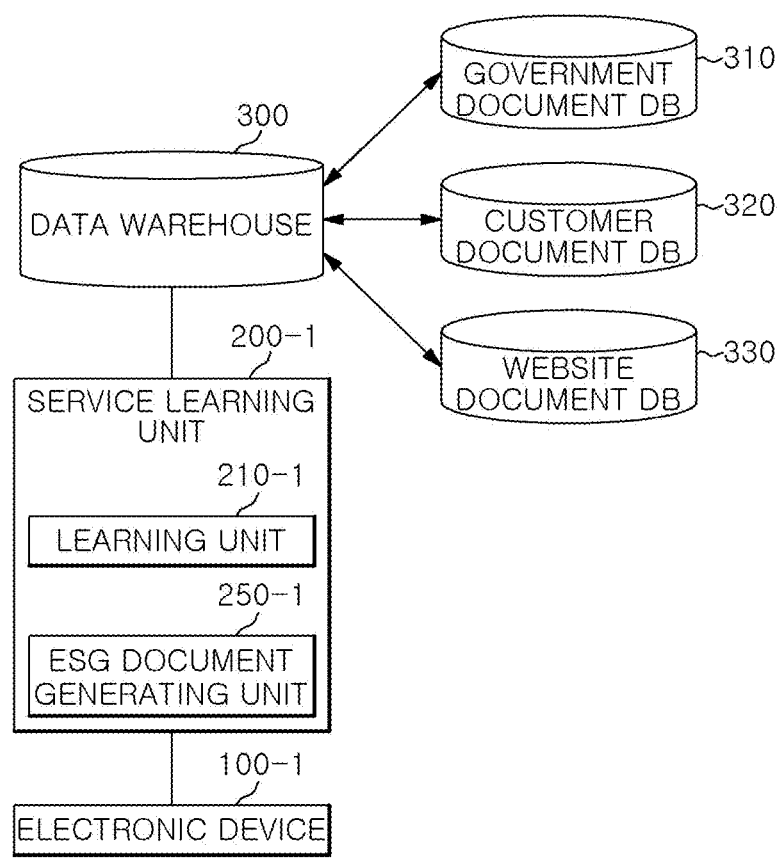
FIG. 6 is a schematic diagram of a system configured to recommend appropriate text for auto-completing ESG documents according to one aspect of the present disclosure.
Figure 7:
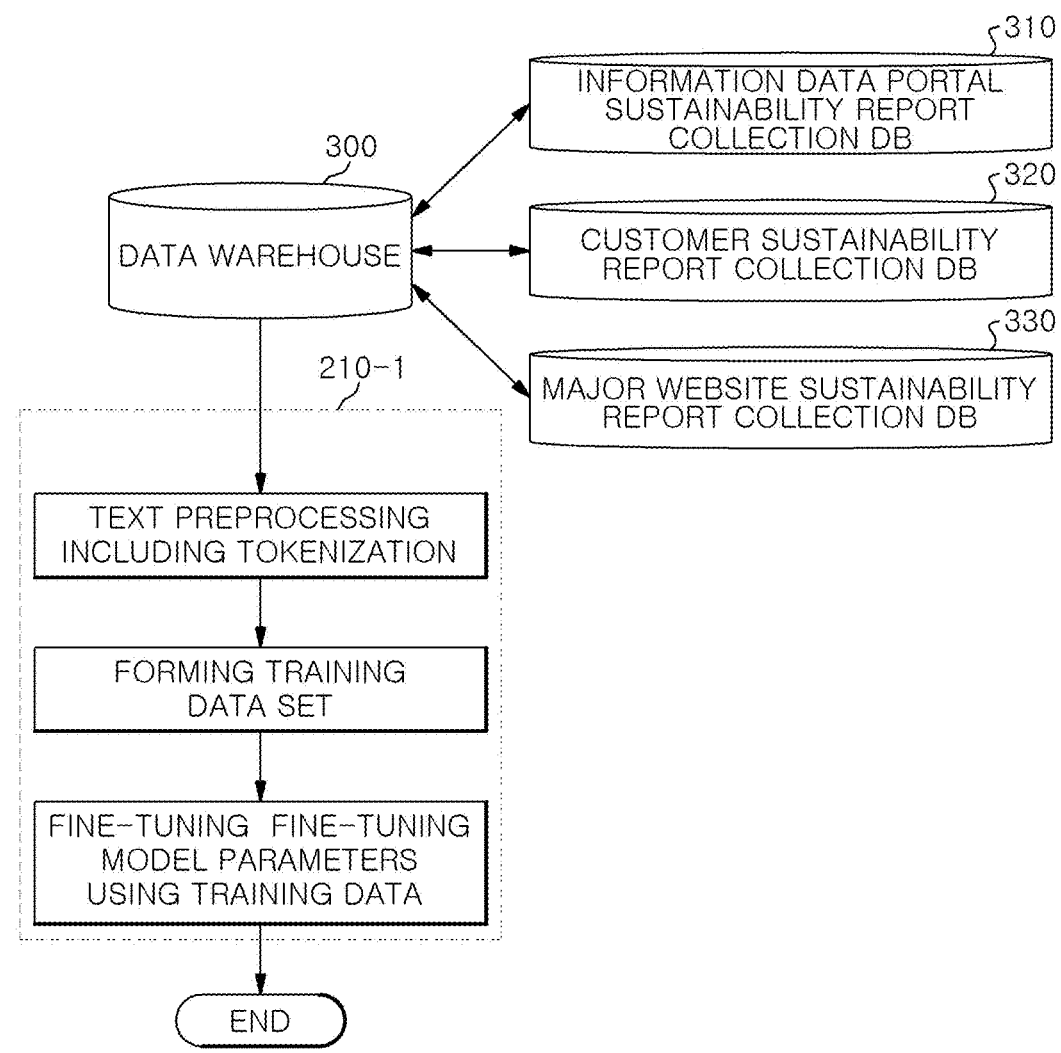
FIG. 7 is a schematic diagram of a process for generating an ESG auto-completion model according to one embodiment of the present disclosure.

FIG. 6 is a schematic diagram of a system configured to recommend appropriate text for auto-completing ESG documents according to one aspect of the present disclosure, and FIG. 7 is a schematic diagram of a process for generating an ESG auto-completion model according to one embodiment of the present disclosure.

Referring to FIGS. 6 and 7, by connecting with a system configured to recommend appropriate text for auto-completing ESG documents, the ESG service provided by the ESG service providing system (1) further includes a service that recommends appropriate text for auto-completing ESG documents. The system configured to recommend appropriate text for auto-completing ESG documents includes a service server (200-1) connected to a data warehouse system (300).

The data warehouse system (300) simply refers to a cloud data warehouse system or other data warehouse system, which is a network-based storage system that includes a central repository of integrated data from one or more disparate sources for data analysis and reporting. The data warehouse system (300) may store current and historical data that can be used to generate enterprise analytical reports. For this purpose, the data warehouse system (300) provides business intelligence tools, tools for extracting, transforming, and loading data into the repository, and tools for managing and retrieving metadata.

The data warehouse system (300) may be configured to provide functionality for binding functions (for example, Structured Query Language (SQL) functions), table functions, or procedures to remote software code that is outside the data warehouse system and exposed as a Web application programming interface.

The data warehouse system (300) may be configured to provide functionality for binding functions (for example, Structured Query Language (SQL) functions), table functions, or procedures to remote software code that is outside the data warehouse system and exposed as a Web application programming interface. The data warehouse system (300) provides users with a mechanism for authoring functions and stored procedures backed by web endpoints implemented externally in cloud computing service platforms (for example, Amazon Web Services® (AWS), Microsoft Azure®, or Google Cloud Services®) provided by externally managed web API management systems. Web endpoints can be, for example, HyperText Transfer Protocol (HTTP) Representational State Transfer (REST) endpoints, but are not limited to these. Users are responsible for provisioning the web endpoints and configuring the endpoints based on business logic within the storage platform. In some cases, the web API management system proxies requests for Lambda functions, and in other cases, the web API management system transforms requests and forwards them to third-party software components outside the data warehouse system. The data warehouse system (300) enables external functions provided by its external software components to be used in queries such as user-defined functions, user-defined table functions, and stored procedures.

The data warehouse system (300) stores various data objects to enable calls to external functions provided by remote software components. The data objects store information used by the network-based data warehouse to obtain temporary security credentials that will be used to call external functions through the web API management system provided by the cloud computing platform. During query execution, the network-based data warehouse system uses temporary security credentials to authenticate through the authentication system of the cloud computing service platform to the target endpoint, and calls functions at the endpoint with batches of target data defined in the query. The target data includes, for example, binary data, Javascript Object Notation (JSON) encoded data, or other text formats such as extensible Markup Language (XML). The target data can be transmitted inline with HTTP requests/responses, or written to commonly accessed storage provided by the cloud computing service platform (for example, Amazon® Simple Storage Service (S3®)). User data stored in the data warehouse system (300) is encoded in a format suitable for transmission through HTTP requests and responses.

Referring to FIG. 7, in the system configured to recommend appropriate text for auto-completing ESG documents, ESG text is extracted from ESG documents written in Korean, English, or a third language and stored in the data warehouse system (300).

Since the ESG text is extracted from ESG documents, it is text that has meanings and expressions conforming to ESG formats. The text conforming to ESG formats may be classified into ESG format categories. The ESG text may include words (for example, keywords) or sentences used in the ESG field. Additionally, the ESG text may further include words, phrases, or sentences used in other fields related to the ESG field. Other fields related to the ESG field may be fields of reference documents used to generate ESG documents.

The ESG documents include ESG sustainability reports of domestic and foreign target companies already disclosed on government web pages, corporate web pages, other websites, etc., or other ESG documents prepared and distributed by ESG managers of individual companies. The target company may refer not only to businesses as companies but also encompass various types of organizations such as institutions and non-profit organizations.

In some embodiments, the ESG documents may be acquired from one or more external DBs among government document DB (310), customer document DB (320), and website document DB (330) shown in FIGS. 1 and 6, and stored in the data warehouse system (300).

The government document DB (310) may collect ESG documents for at least one company searched by accessing government data portals.

The customer document DB (320) may collect ESG documents for relevant customers by accessing the data portal of a customer related to the system configured to recommend appropriate text for auto-completing ESG documents, for example, a customer company subscribed to the service provided by the system (1). Multiple ESG documents may be collected for a single customer.

The website document DB (330) may access one or more websites pre-designated as major websites and collect ESG documents disclosed on the accessed websites by searching.

The service server (200-1) is multiple computer systems or computer software implemented as a network server. Here, a network server refers to a computer system and computer software (network server program) that is connected to subordinate devices that can communicate with other network servers through a computer network such as a private intranet or the internet, receives work requests, performs tasks, and provides results. However, it should be understood as a broader concept that includes not only such network server programs but also a series of applications running on the network server and, in some cases, various databases built within it. The service server (200-1) may be implemented as any type or combination of types of computing devices such as network servers, web servers, file servers, supercomputers, desktop computers, etc. For this purpose, the service server (200-1) includes at least one processor that can process data, memory that stores data, and a communication unit that transmits/receives data.

The service server (200-1) may provide an ESG document auto-completion service that recommends text (for example, sentences) conforming to ESG formats to help users more easily write their ESG documents. For this purpose, the service server (200-1) predicts text, words (for example, keywords), or sentences to be placed in the sequence following the input value by applying the input value received from the user's electronic device (100-1) to a pre-trained ESG auto-completion model. Additionally, the service server (200-1) may be configured to transmit the prediction results to the user's electronic device (100-1).

In some embodiments, the service server (200-1) may further include a training unit (210-1). As shown in FIG. 7, the data warehouse system (300) may supply the stored ESG text data to the training unit (210-1) as sample text data for generating an ESG auto-completion model.

The training unit (210-1) may train a pre-designed ESG auto-completion model by natural language processing of the sample text data. In specific embodiments, the training unit (210-1) may be configured to perform pre-processing operations that natural language process the sample text data, operations that form a training data set based on tokens of the sample text, and operations that train an ESG auto-completion model with a pre-designed neural network structure using the training data set.

As shown in FIG. 7, the training unit (210-1) performs pre-processing operations for training that natural language process the corpus (for example, sentences) of received sample text.

The pre-processing operations may include tokenization processing operations and/or special token addition operations.

The tokenization processing operation is an operation of dividing the corpus of the text to be pre-processed into tokens, which are pre-set minimum division units, to generate multiple tokens. The token unit may be pre-set as, for example, word units or morpheme units. When a sentence is provided to the training unit (210-1), the training unit (210-1) may form a token set for that sentence by dividing the sentence into token units. Each token set consists of multiple tokens generated from a single corpus.

The special token addition operation is an operation that adds one or more special tokens from pre-defined multiple special tokens to the corpus of the text to be pre-processed. The special token is a special token used to express the output text of the ESG auto-completion model in a more natural text style. Unlike tokens that indicate text, the special tokens may not indicate text. Hereinafter, for clarity of explanation, tokens generated by dividing the text of the corpus into token units are referred to as text tokens to describe the embodiments of the present disclosure in more detail.

The special tokens may include, for example, tokens for unknown words, tokens for matching the length of batch data, tokens indicating the beginning of a sentence, tokens indicating the end of a sentence, and/or other tokens outside of sentence text. When special tokens are added to the sample text and the corpus of the sample text with added special tokens is tokenized, the ESG auto-completion model receiving the token set of the corpus of the sample text with added special tokens may more easily decode the text of the input tokens.

In some embodiments, the special token addition operation may be performed when there is no need to divide the text corpus to be pre-processed into tokens, or when there are pre-associated language rules for the language in which the output text of the ESG auto-completion model is expressed.

Through these pre-processing operations, the training unit (210-1) forms a training data set using a token set consisting of text tokens divided from the corpus of the sample text into token units, a token set consisting of token(s) with only special tokens added without division, or a token set consisting of text tokens divided after special tokens are added to the corpus of the sample text.

The training unit (210-1) may form a training data set consisting of multiple training samples. Each training sample includes training data and label data.

Each of the multiple training samples may be formed from token sets obtained from multiple sample text corpora. The training data and label data of each training sample are obtained from token sets corresponding to the same sample text corpus.

The training data may be two or more tokens included in the token set obtained from the corpus of the sample text arranged in the order of the corpus of the sample text. The token arrangement of the training data corresponds to part or all of the corpus of the input text (i.e., sample text).

In some embodiments, the training data set may be sub-setted by sample sentences. Training data for each sample sentence may be a token arrangement that includes the very first token in the sample sentence. In one example, the training data in a sub-set for a sample sentence may be the first token in the sample sentence, or a token arrangement including the first token to the second token in the sample sentence, or a token arrangement including the first token to the third token in the sample sentence, . . . , or a token arrangement from the first token to the token just before the last token in the sample sentence.

The label data may be the remaining tokens arranged according to the sequence of the corpus of the sample sentence, excluding the token arrangement of the training data from the entire token arrangement representing the sample sentence. The remaining arranged tokens may include the last token in the sample sentence. Multiple label data correspond to each of the multiple training data.

In the example, the label data for training data in a sub-set generated from the same sample sentence may be as follows: the label data corresponding to training data with the first token in the sample sentence is the remaining arranged tokens with the second text token to the last text token in the sample sentence arranged sequentially; the label data corresponding to training data with a token arrangement including the first token to the second token in the sample sentence is the remaining arranged tokens with the third text token to the last text token in the sample sentence arranged sequentially; the label data corresponding to training data with a token arrangement including the first token to the third token in the sample sentence is the remaining arranged tokens with the fourth text token to the last text token in the sample sentence arranged sequentially; . . . , and the label data corresponding to training data with a token arrangement from the first token to the token just before the last token in the sample sentence may be the last text token.

The training data set including the training data and label data generated by the training unit (210-1) is used to train the ESG auto-completion model. Through the training unit (210-1), the ESG auto-completion model is trained to predict the corpus of text appropriate to be placed in the next sequence of the corpus of input text by inferring the association between the corpus of input text constituting part of a sentence and the corpus of remaining text constituting the rest of the sentence. Here, the corpus of text may be a word (for example, a keyword), phrase, or sentence. The corpus of remaining text is text that can be placed after the corpus of input text and may be the corpus of text corresponding to the label data.

The ESG auto-completion model includes a neural network designed to at least partially restore the remaining text that can be positioned in the input text by natural language processing of the input text. For example, the ESG auto-completion model may be a PLM or other natural language processing-based network model. The ESG auto-completion model may be configured to restore the corpus of text suitable to be placed in the next sequence of the corpus of input text.

In some embodiments, the ESG auto-completion model may include an encoder and a decoder. The encoder is configured to extract features from the input token arrangement, and the decoder is configured to restore the corpus of text that can be placed in the next sequence of the input corpus indicated by the input token arrangement based on the extracted features. This extraction capability of the encoder and restoration capability of the decoder can be learned using the training data set by the training unit (210-1).

Through the training unit (210-1), the ESG auto-completion model is trained so that the parameters within the model predict text corpus suitable to be placed after a specific text corpus by repeatedly performing the operation of appropriately restoring the text corpus located after a specific text corpus in the corpus of sample text for training.

Hereinafter, the training process is described in more detail using the example ESG auto-completion model including an encoder and a decoder.

The training unit (210-1) inputs the training data of each training sample in the training set into the ESG auto-completion model.

The encoder is configured to extract features of input tokens by natural language processing of the input tokens. The features may be extracted in the form of vectors or matrices such as maps. In the example, the input tokens of the encoder are a single token or token arrangement included in the training data.

The decoder is configured to restore the next text tokens to be placed after the sequence of tokens in the training data based on the features of the tokens from the input training data. The decoder learns to ultimately restore a sentence composed of the input tokens and predicted text tokens by sequentially proceeding with the process of restoring a specific text token to be positioned after the input token, and restoring another specific text token to be positioned after the restored specific text token. When the decoder is trained, the tokens restored by the decoder may match or be similar to the remaining token arrangement of the label data corresponding to the training data. As mentioned earlier, the remaining token arrangement may be a single token (i.e., the last token). In the example mentioned above, when the token arrangement of the training data is input to the encoder, the decoder is trained to restore at least one other token that can be positioned in the input token arrangement in the sentence constituted by the input token arrangement. The restoration value of the decoder may be at least one text token predicted to be suitable for placement after the input text among sentences that can be made with the input text, and is used as a prediction value for each training sample.

Figure 8:
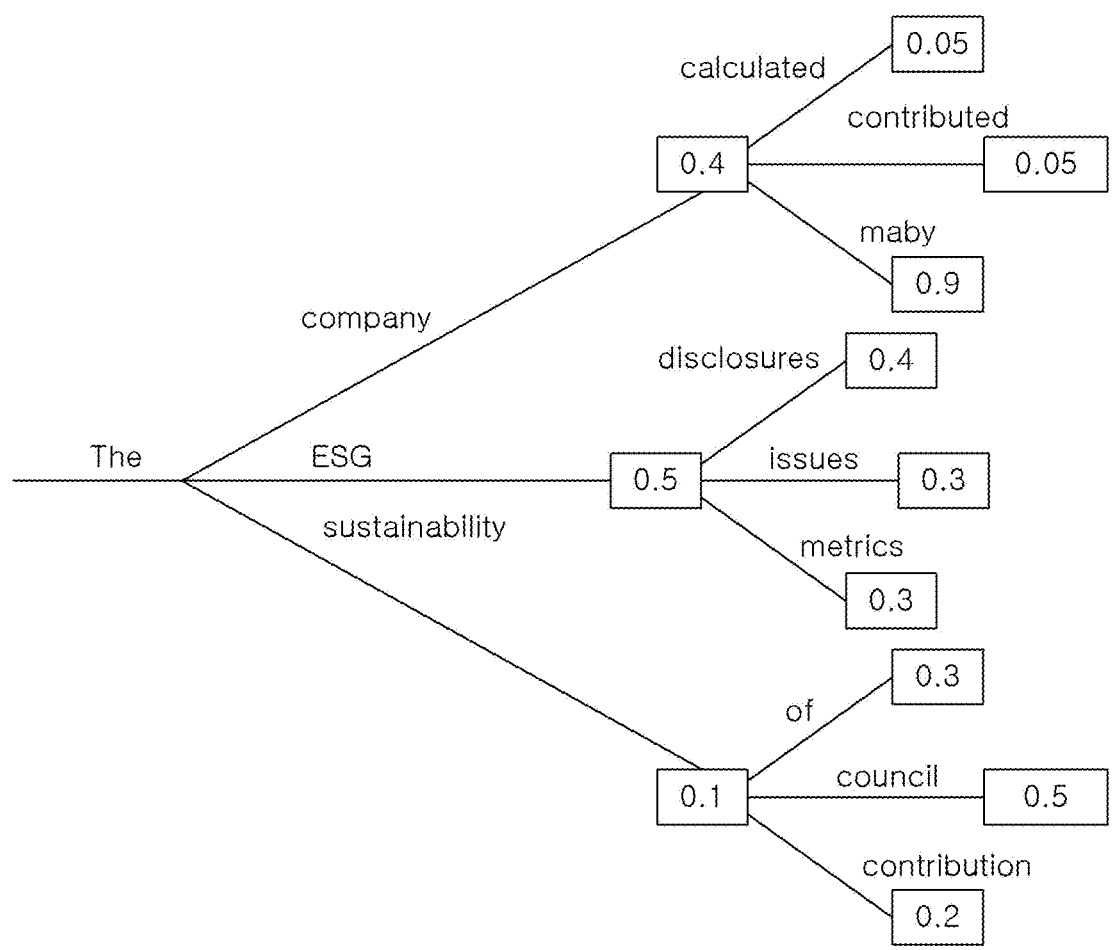
FIG. 8 is a schematic diagram of an operation for predicting output text in an ESG auto-completion model according to one embodiment of the present disclosure.

FIG. 8 is a schematic diagram of an operation for predicting output text in an ESG auto-completion model according to one embodiment of the present disclosure.

Referring to FIG. 8, the decoder may restore the remaining token arrangement in a grid search manner. The decoder predicts multiple candidate tokens that can be placed in the next order of a specific token, selects the most likely token among the predicted multiple candidate tokens, and restores the remaining token arrangement. As shown in FIG. 8, the multiple candidate tokens are tokens composed of text in the ESG field. The decoder selects the token most likely to be placed in the position of the remaining token arrangement based on the front/back context of the remaining token arrangement. By sequentially selecting tokens according to this probability, it is possible to determine tokens that are predicted to constitute the sentence while being able to be placed after the input tokens in the sentence constituted by the input tokens.

The decoder is trained to predict tokens that include expressions or words frequently used in the ESG field. The sequential collection of predicted tokens provides phrases or sentences with context suitable for inclusion in ESG documents.

The training unit (210-1) may adjust the parameters of the ESG auto-completion model to learn the function of recommending recommendation text. The parameters of the ESG auto-completion model may include parameters of a pre-designed artificial neural network structure.

The training unit (210-1) may adjust the parameters of the ESG auto-completion model so that the error between the calculated prediction value (for example, the decoder's output value) and the actual value decreases or is minimized. Here, the actual value is the value of the label data included together in the training sample used to calculate the output value. The label data corresponds to the training data of the input tokens that provided the prediction value.

When the error between the output value and the actual value is minimized, the trained ESG auto-completion model may accurately predict the corpus of text to be placed in the next sequence of the corpus of input text. If the ESG auto-completion model more accurately inferred the association between the corpus of input text and the corpus of remaining text, the corpus of remaining text suitable for positioning after the input text in the sentence composed of the input text will be more accurately predicted.

The ESG auto-completion model completed through this process is configured to predict text suitable for placement in the next position of the corpus of input text on an ESG document as recommendation text. The output text may be text that satisfies the format of an ESG document, having context that connects to the context of the input text and having expressions specialized for the ESG field.

In some embodiments, when a single corpus of input text is input, the ESG auto-completion model may produce one or more text corpora to be placed in the next sequence of the single corpus of input text. For example, when a single sentence is input, the ESG auto-completion model may produce one or multiple candidate sentences suitable for placement in the next sequence of the single sentence. Also, in some embodiments, the ESG auto-completion model may produce multiple recommendation text corpora and output some or all of the recommendation text corpora as final recommendation text corpora based on probability values for each recommendation text corpus.

For example, the ESG auto-completion model may be set so that the seed value of the model has a random value each time it performs the operation of producing recommendation text to be positioned after the input text. If the operation of producing the recommendation text for the same input text is repeated multiple times, it may produce two or more different recommendation text corpora among the multiple times.

In this case, the number of recommendation texts may depend on a pre-designated hyperparameter that indicates the number of repetitions of the operation of producing the recommendation text for the same input text.

In some embodiments, the ESG auto-completion model may output some recommendation text corpora as final recommendation text corpora where the probability value for each recommendation text corpus is greater than or equal to a pre-set threshold probability value. Then, the system (1) may place the recommendation text corpus corresponding to the user's selection command in the next position of the input text. The recommendation text corpus placed according to the user's selection is used as new input text for producing a new recommendation text corpus for the next sequence of the predicted recommendation text. Through repetition of this process, the user may complete part or all of the content of an ESG document with just a few selection commands.

In specific embodiments, the decoder may include a fitting layer. The fitting layer is placed at the end of the decoder so that the ESG auto-completion model predicts text with meanings and/or expressions that match the ESG format as the next sequence text of the input text. In some embodiments, if the decoder includes a probability function (for example, softmax), the fitting layer may be placed on the data path before the probability function.

The training unit (210-1) may perform reinforcement learning operations in which the ESG auto-completion model learns at least partially the meaning implied in the input text using the fitting layer.

The fitting layer is configured to assign weights to data that is closer to the ESG format for the next sequence text (for example, words, phrases, or sentences) that will be predicted and output when input text is entered, before the recommendation sentence is output. In some embodiments, higher weight values may be assigned according to the degree of suitability for the ESG format. Through the fitting layer, the ESG auto-completion model can at least partially learn the semantic aspects implied in the text of the ESG field that matches the ESG format.

In some embodiments, the degree of suitability for the ESG format may be based on frequency in ESG documents.

Let's assume that the ESG auto-completion model is designed based on the GPT (Generative Pre-trained Transformer) model. If the ESG auto-completion model is pre-trained to predict the next word, phrase, or sentence of input text without including a fitting layer, corpus data from various categories may be predicted as the next word, phrase, or sentence. In these specific embodiments, the ESG auto-completion model may implement the next word, phrase, or sentence of the input text from corpus data of the ESG format category through the fitting layer.

As a result, the ESG auto-completion model including the fitting layer is trained to predict the corpus of text that is suitable (i.e., most likely) to be placed in the next position of the corpus of input text while satisfying the format of ESG documents.

Additionally, in some embodiments, if the sample text is parsed text from ESG documents, the ESG generation model can be trained using the parsed text of ESG documents and the structured processing results corresponding to the parsed text. The structured processing results are obtained from the operation results of the structured data processor (140). In some embodiments, the training unit (210-1) may call upon items and their values for each ESG document that have been table-converted by the structured data processor (140) and already stored in the ESG document DB (220) for use as training data.

Specifically, the training unit (210-1) may be trained using a training data set consisting of training samples that each have the text of parsed ESG documents and the structured processing results corresponding to the parsed text as training data.

In this case, the training unit (210-1) can generate input data by concatenating the text of parsed ESG documents and the corresponding structured processing results, apply the input data to the ESG generation model, and train the ESG generation model. Then, the ESG generation model is trained to predict more suitable next text by considering not only the potential correlation between the input text and the text to be positioned next but also another potential correlation between the structured data for the input text and the text to be positioned next to the input text. While learning based on general text alone may make it difficult to understand the context of sentence generation or flow, if structured data parsed from documents is additionally provided, the ESG generation model can understand more specific data structures or relationships for the input text. Particularly because the structured processing results of the structured data processor (140) clearly define the relationship between the text of parsed ESG documents in the document and question items, or the relationship between this text and evaluation items, the ESG generation model can generate more natural and accurate sentences by better reflecting the context that the input text has based on this relationship information.

The service server (200-1) supports the user's work of writing ESG documents by utilizing the ESG auto-completion model trained as in FIG. 7. In some embodiments, the service server (200-1) may further include an ESG document generation unit (250-1) that supports the user's ESG document completion by predicting recommendation text to be placed in the next position of the user's input text. The ESG document generation unit (250-1) is configured to use the ESG auto-completion model. The operation of the ESG document generation unit (250-1) is described in more detail below with reference to FIG. 10.

The electronic device (100-1) is configured to input input text to initiate the prediction operation of the service server (200-1) and output the content of an at least partially auto-completed ESG document including the recommendation text predicted by the service server (200-1) or the input text and the predicted recommendation text. Also, in some embodiments, the electronic device (100-1) may be further configured to select one text from among the predicted recommendation texts to be used as document content.

The electronic device (100-1), as a client terminal device communicating with the service server (200-1), includes at least one processor that can process data, memory that stores data, and a communication unit that transmits/receives data. The electronic device may be, for example, a laptop computer, other computing device, tablet, cellular phone, smartphone, smartwatch, smart glasses, head-mounted display (HMD), other mobile device, or other wearable device.

In alternative embodiments, the training unit (210-1) is not limited to being included within the service server (200-1). The training unit (210-1) may be implemented as an external component of the service server (200-1). In this case, the training unit (210-1) is configured to electrically communicate with the data warehouse system (300) and the service server (200-1). The service server (200-1) may receive a pre-trained ESG auto-completion model from the external training unit (210-1) and provide an ESG text auto-completion service that recommends sentences matching the ESG format to help users write their ESG documents more easily by utilizing the received model.

Figure 9:
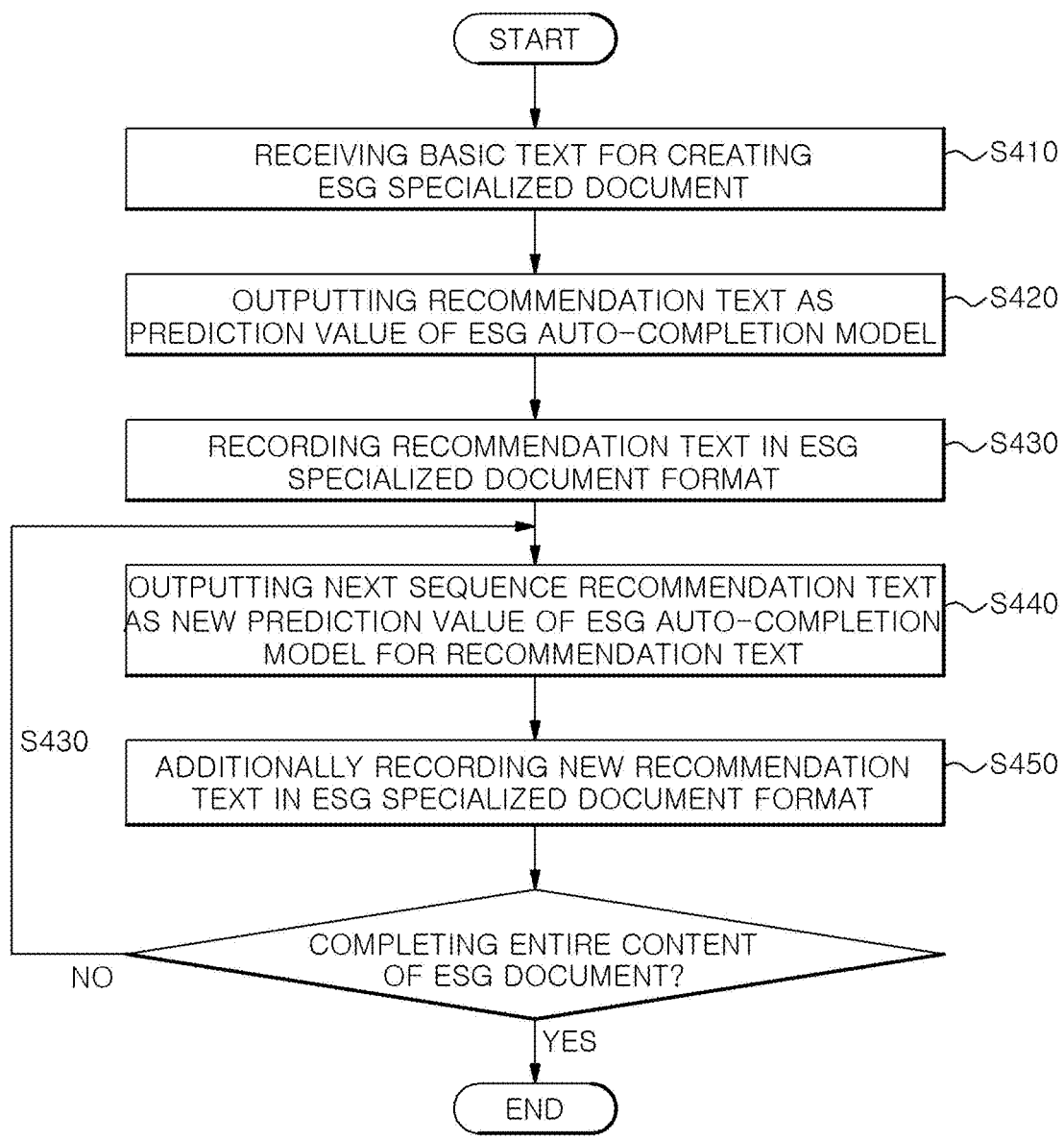
FIG. 9 is a flow diagram of a method for recommending appropriate text for auto-completing ESG documents according to another aspect of the present disclosure.

FIG. 9 is a flow diagram of a method for recommending appropriate text for auto-completing ESG documents according to another aspect of the present disclosure. The method for recommending appropriate text for auto-completing ESG documents in FIG. 9 (hereinafter, ESG text recommendation method) may be performed by one or more computing devices such as the system configured to recommend appropriate text for auto-completing ESG documents in FIG. 6, connected to the ESG service providing system (1) in FIG. 1. Here, ESG text refers to text that satisfies the format of ESG documents.

Referring to FIG. 9, the ESG text auto-completion method includes a step (S410) of receiving basic text from the user's electronic device (100-1) for completing ESG text to be written as part of the content of the ESG document. The basic text is used as a clue to predict text to be placed in the next sequence.

In the step (S410) of receiving the basic text, the basic text is a word (for example, a keyword), phrase, or sentence to be written in an ESG document. The basic text may be, for example, some or all of the essential text required to complete the ESG document, or text representing part of the entire content of the ESG document.

For the entire content of the ESG document to be completed to be written in the ESG document, when basic text belonging to part of the entire content is input, some or all of the remaining content is recommended and the ESG document is auto-completed.

In some embodiments, the basic text in step (S410) may be input through an interface screen provided when accessing a specific web page operated by a system configured to recommend appropriate text.

The interface screen may be configured to express the ESG format desired to be completed. Through the interface screen, the user may directly input content into the format of the ESG document they want to complete or receive auto-completion results in real-time.

Additionally, the ESG text recommendation method includes a step (S420) of predicting recommendation text to be placed in the next sequence of the basic text by inputting the basic text received in step (S410) into a pre-trained ESG auto-completion model.

In some embodiments, the step (S420) of producing the recommendation text may include a step of pre-processing the corpus of the basic text to form input data, and a step of producing at least one recommendation text by inputting the formed input data into the pre-trained ESG auto-completion model.

The pre-processing operation performed in step (S420) includes tokenization processing operations and/or special token addition operations. The pre-processing operation may correspond to the pre-processing operation used to generate the training data for the ESG auto-completion model. For example, if the training data is generated by pre-processing only with tokenization processing operations, the service server (200-1) may generate input data by tokenization processing the corpus of the basic text to produce recommendation text.

The ESG auto-completion model in step (S420) is pre-trained to predict the corpus of ESG text that is suitable to be placed in the next sequence of the basic text in step (S410). The ESG auto-completion model may be configured to produce one or more text corpora that may be placed in the next sequence of the basic text, and output at least one of the produced one or more text corpora as recommendation text corpora.

The corpus of ESG text may be a word (for example, a keyword), phrase, or sentence.

In some embodiments, the ESG auto-completion model may output one or more ESG text corpora as recommendation text corpora.

The service server (200-1) may transmit the output one or more recommendation text corpora to the electronic device (100-1). The electronic device (100-1) may provide the received recommendation text to the user. In some embodiments, the electronic device (100-1) may provide a result of arranging the basic text and each recommendation text in order.

FIG. 10 illustrates output results of a corpus of recommended text according to one embodiment of the present disclosure.

Referring to FIG. 10, if the sentence "Target Co. is consistently performing active facility investment and activities to reduce greenhouse gases" is input as basic text in step (S410), one or more recommendation texts suitable to be placed in the next sequence of that sentence may be output from the ESG auto-completion model. The ESG auto-completion model may produce multiple recommendation sentences and, based on probability values for each of the multiple recommendation sentences, output the first sentence to the fifth sentence as recommendation text as shown in FIG. 10. Each of the first to fifth sentences may be provided placed in the next sequence of the basic sentence.

Since the ESG auto-completion model used in step (S420) has been described above with reference to FIGS. 7 and 8, a detailed explanation is omitted.

Referring back to FIG. 9, the ESG text recommendation method may further include a step (S430) of writing the recommendation text in the format of the ESG document.

If a single recommendation text is output in step (S420), the output single recommendation text may be written immediately in the next sequence of the basic text.

If multiple recommendation texts are output in step (S420), the recommendation text written in step (S430) is one of the multiple recommendation texts. The recommendation text to be written may be determined by the user's selection. For example, the user's electronic device (100-1) displays the screen of FIG. 10 to prompt a user command to select one of the first to fifth recommendation sentences as the recommendation sentence to be written in the next sequence of the basic sentence. When one sentence is selected, the electronic device (100-1) transmits information of the selected recommendation sentence to the service server (200-1) to update the current content of the ESG document with the content of the basic text and recommendation text.

Additionally, the ESG text recommendation method may further include a step (S440) of predicting a new recommendation text to be placed in the next sequence of the recommendation text of step (S420) by inputting the recommendation text predicted in step (S420) into the ESG auto-completion model. Then, the ESG auto-completion model outputs a new recommendation text that has context connected to the context of the recommendation text and has expressions specialized for the ESG field.

Additionally, the ESG text recommendation method may further include a step (S450) of additionally writing the new recommendation text output in step (S440) in the format of the ESG document of step (S430). The format of the ESG document in step (S430) includes the content of the basic text and recommendation text.

When new recommendation text is written in step (S450), the ESG document being written is updated to include the content of the basic text of step (S410), the recommendation text of step (S420), and the new recommendation text of step (S440). Since the operation of step (S450) is similar to the operation of step (S430), a detailed explanation is omitted.

In some embodiments, the ESG text recommendation method may further include a step (S460) of repeating steps (S440, S450) until the entire content of the ESG document is completed.

Then, the user may auto-complete the ESG document by inputting minimal text as basic text through the electronic device (100-1) in step (S410).

It will be apparent to those of ordinary skill in the art that the electronic device (100), service server (200), electronic device (100-1), service server (200-1), or system (1) may include other components. For example, the service server (200) may include other hardware elements necessary for the operations described in this specification, including input devices for data entry and output devices for printing or other data display. The service server (200-1) may include other hardware elements necessary for the operations described in this specification, including input devices for data entry and output devices for printing or other data display. Additionally, the system (1) may further include a network, network interface, and protocols connecting the service server (200, 200-1) and external devices (for example, user terminals or external databases, etc.).

When implementing embodiments of the present disclosure using hardware, ASICs (application specific integrated circuits), DSPs (digital signal processors), DSPDs (digital signal processing devices), PLDs (programmable logic devices), FPGAs (field programmable gate arrays), etc., configured to perform the embodiments of the present disclosure may be provided in the components of the present disclosure.

The operations of the method for establishing an ESG database composed of structured ESG data using an ESG auxiliary tool and the ESG service providing system (1) performing the same according to the embodiments of the present disclosure described above may be implemented, at least partially, as a computer program and recorded on a computer-readable recording medium. For example, it may be implemented with a program product consisting of a computer-readable medium including program code, which can be executed by a processor to perform any or all of the steps, operations, or processes described.

The computer-readable recording medium includes all types of recording devices in which data readable by a computer is stored. Examples of the computer-readable recording medium include ROM, RAM, CD-ROM, magnetic tape, floppy disk, optical data storage device, etc. Furthermore, the computer-readable recording medium may be distributed to computer systems connected by a network, and computer-readable code may be stored and executed in a distributed manner. Also, functional programs, codes, and code segments for implementing the embodiments will be readily understood by those skilled in the art to which the present disclosure pertains.

The present disclosure has been described with reference to the embodiments illustrated in the drawings, but these are merely exemplary, and those with ordinary knowledge in the field will understand that various modifications and variations of embodiments are possible. However, such modifications should be considered to be within the technical scope of protection of the present disclosure. Therefore, the true technical scope of protection of the present disclosure should be determined by the technical idea of the appended claims.

INDUSTRIAL APPLICABILITY

The ESG service providing system of the present disclosure is an invention related to the ESG technology field, and can provide the effect of efficiently classifying, storing, and managing data in ESG documents used for ESG evaluation, so high industrial applicability is expected based on the industrial trend of incorporating ESG evaluation criteria into corporate value evaluation.

What is claimed is:

1. A method for establishing an environment, social, and governance (ESG) database composed of structured ESG data using an ESG auxiliary tool, performed by an electronic device including a structured data processor,
   wherein the electronic device is connected to an ESG management item database that has a pre-stored plurality of ESG management items, and the method comprises:
       parsing an ESG document subject to structuring, wherein the ESG document includes unstructured ESG data;
       screening whether the parsed ESG document includes items corresponding to at least one of the pre-stored plurality of ESG management items;
       determining whether a screening result includes an abnormality based on a signal received from an interface provider of the electronic device;
       specifying a selection status for items in the ESG document based on whether an item corresponding to the ESG management item is included in the ESG document;
       based on receipt of the signal, displaying an auxiliary tool interface screen configured to receive a modification input from a user;
       determining whether to activate input fields of the auxiliary tool interface screen for final input field values for the pre-stored plurality of ESG management items based on a specification result of the selection status indicating the abnormality; and
       generating the structured ESG data by obtaining content of items corresponding to ESG management items determined to be included in the ESG document,
   wherein the screening of the parsed ESG document comprises determining whether the parsed ESG document includes the corresponding item based on at least one of code values and data set values for each ESG management item stored in the ESG management item database,
   wherein the determining of the abnormality in the screening result comprises determining the abnormality in the screening result based on at least one of a confirmation input of the user or surrounding data for data matching the at least one of the code values and the data set values in the ESG document,
   wherein the specifying of the selection status comprises specifying the ESG document as a first selection status based on the corresponding item being included in the parsed ESG document, and specifying the ESG document as a second selection status based on the corresponding item not being included in the parsed ESG document,
   wherein the generating of the structured ESG data includes:
       providing a location of the ESG management item in the ESG document that is specified as the first selection status;
       obtaining the content of the corresponding ESG management item based on the provided location; and
       generating the structured ESG data by table-converting a list of selected ESG management items and acquired content of each ESG management item to generate the structured ESG data,
   wherein the obtaining of the content of the corresponding ESG management item comprises obtaining content of a final field input value based on at least one of content input of the user or surrounding data for the provided location.

2. The method of claim 1,
   wherein the electronic device is further connected to an ESG document database that stores the structured ESG data converted from other unstructured ESG data of other ESG documents, and
   wherein the generating of the structured ESG data further comprises obtaining data from the other ESG documents as content for the corresponding item based on receiving a user input indicating the use of existing ESG document data.

3. The method of claim 1,
   wherein the electronic device further includes an output unit, and the method further comprises:
       managing already stored ESG management items, wherein managing operations of the already stored ESG management items includes modifying, deleting, or creating operation,
wherein the managing of the already stored ESG management items includes:
  confirming whether the already stored ESG management items have been stored;
  based on the already stored ESG management items being stored, receiving a request for modification, deletion, or creation of the already stored ESG management items;
  based on the modification, deletion, or creation request for the ESG management items being received, displaying another auxiliary tool interface screen showing an already stored ESG management item set in an item level structure.

4. The method of claim 3, wherein the managing of the already stored ESG management items further includes:
  deactivating the input field for the content of the target item based on a requested target item not being a lowest-level item;
  activating the input field for the content of the target item based on the requested target item being a lowest-level item;
  receiving input for the content of the target item to be modified or created through the activated input field; and
  storing the content of the input item in the ESG management item database.

5. The method of claim 4, wherein the receiving of the input for the content of the target item through the activated input field includes providing the auxiliary tool interface screen for receiving the content of the target item,
  wherein the auxiliary tool interface screen includes a first sub-area containing the activated input field and a second sub-area containing an item structure level, and in the second sub-area, item sets by major category are displayed classified by the same item levels.

6. A non-transitory computer-readable recording medium on which a computer program for performing the method for the establishing of the ESG database composed of the structured ESG data using the ESG auxiliary tool according to claim 1 is recorded.

7. An electronic device for establishing an environment, social, and governance (ESG) database composed of structured ESG data using an ESG auxiliary tool,
  wherein the electronic device is connected to an ESG management item database with a pre-stored plurality of ESG management items, and the electronic device comprises:
    a structured data processing unit configured to generate the structured ESG data for an ESG document by obtaining items corresponding to at least one of the pre-stored plurality of ESG management items and content of the corresponding items from the ESG document containing unstructured ESG data; and
    an interface provider configured to provide an auxiliary tool interface screen through an output unit for receiving user input to convert the unstructured ESG data in ESG documents into the structured ESG data,
  wherein the structured data processing unit is further configured to:
    parse an ESG document subject to structuring, wherein the ESG document includes the unstructured ESG data,
    screen whether the parsed ESG document includes items corresponding to at least one of the pre-stored plurality of ESG management items,
    determine whether a screening result includes an abnormality based on a signal received from the interface provider,
    specify a selection status for items in the ESG document based on whether an item corresponding to the ESG management item is included in the ESG document,
    based on receipt of the signal, display the auxiliary tool interface screen configured to receive a modification input from a user;
    determine whether to activate or deactivate input fields of the auxiliary tool interface screen for final input field values for the pre-stored plurality of ESG management items based on a specification result of the selection status indicating the abnormality, and
    generate the structured ESG data by obtaining the content of items corresponding to ESG management items determined to be included in the ESG document,
  wherein the structured data processing unit is further configured to determine whether the parsed ESG document includes the corresponding item based on at least one of code values and data set values for each ESG management item stored in the ESG management item database,
  wherein the structured data processing unit is further configured to determine the abnormality of the screening result based on at least one of a confirmation input of the user or surrounding data for data matching the at least one of the code values and the data set values in the ESG document,
  wherein the structured data processing unit is further configured to specify the ESG document as a first selection status based on the corresponding item being included in the parsed ESG document, and to specify the ESG document as a second selection status based on the corresponding item not being included in the parsed ESG document,
  wherein the structured data processing unit is further configured to:
    provide a location of the ESG management item in the ESG document that is specified as the first selection status,
    obtain the content of the corresponding ESG management item based on the provided location, and
    generate the structured ESG data by table-converting a list of selected ESG management items and acquired content of each ESG management item,
  wherein the structured data processing unit is further configured to obtain the content of a final field input value based on at least one of content input of the user or surrounding data for the provided location.

* * * * *